US00RE37450B1

(19) United States
(12) Reissued Patent
Deken et al.

(10) Patent Number: US RE37,450 E
(45) Date of Reissued Patent: Nov. 20, 2001

(54) DIRECTIONAL MULTI-BLADE BORING HEAD

(75) Inventors: Arthur D. Deken; Cody L. Sewell, both of Perry, OK (US)

(73) Assignee: The Charles Machine Works, Inc., Perry, OK (US)

(21) Appl. No.: 09/488,914

(22) Filed: Jan. 19, 2000

Related U.S. Patent Documents

Reissue of:
(64) Patent No.: 5,392,868
Issued: Feb. 28, 1995
Appl. No.: 08/163,756
Filed: Dec. 9, 1993

U.S. Applications:
(

(63) Continuation-in-part of application No. 08/067,298, filed on May 25, 1993, now Pat. No. 5,341,887, which is a continuation-in-part of application No. 07/857,167, filed on Mar. 25, 1992, now Pat. No. 5,242,026, which is a continuation-in-part of application No. 07/575,568, filed on Aug. 31, 1990, now Pat. No. 5,148,880, which is a continuation-in-part of application No. 07/211,889, filed on Jun. 27, 1988, now Pat. No. 4,953,638.

(51) Int. Cl.[7] ..... E21B 7/00
(52) U.S. Cl. ..... 175/62; 175/376
(58) Field of Search ..... 175/61, 62, 19, 175/73, 385, 398, 400, 376

(56) References Cited

U.S. PATENT DOCUMENTS

| | | | | |
|---|---|---|---|---|
| 81,580 | | 9/1868 | Baker . | |
| 102,699 | | 5/1870 | Neff . | |
| 150,193 | | 4/1874 | Sandbach et al. . | |
| 154,138 | | 8/1874 | Herington . | |
| 1,766,202 | | 6/1930 | Thompson . | |
| 2,122,063 | * | 6/1938 | Hughes | 175/340 |
| 2,124,414 | | 7/1938 | Goldman | 255/71 |

(List continued on next page.)

FOREIGN PATENT DOCUMENTS 2126267 3/1984 (GB) .

OTHER PUBLICATIONS

Texas Mill Supply, Inc. advertisement for Curv–O–Mark (undated).

Blue Demon For Waterwell, Quarry, and Seismic Applications, published by the Blue Demon Company, Inc., prior to Feb. 27, 1995 (pp. 1–8).

*Primary Examiner*—Thomas B. Will
*Assistant Examiner*—M. Petravick
(74) *Attorney, Agent, or Firm*—McKinney & Stringer, P.C.

(57) ABSTRACT

Directional boring bits (1100, 1200) are disclosed which have at least one roller cone (1202, 1104) and also each define a deflecting surface (1104) for deflecting the boring bit when the bit is advanced without rotation. The borehole can be curved by pushing the bit forward without rotation.

5 Claims, 22 Drawing Sheets

U.S. PATENT DOCUMENTS

| | | | |
|---|---|---|---|
| 2,196,940 | 4/1940 | Potts | 255/61 |
| 2,324,102 | 7/1943 | Miller et al. | 255/1.6 |
| 2,350,986 | 6/1944 | Collins | 255/61 |
| 2,568,573 | 9/1951 | Walker | 255/61 |
| 2,686,660 | 8/1954 | Storm | 255/1.6 |
| 2,903,239 | 9/1959 | Standridge | 255/1.6 |
| 3,094,177 | 6/1963 | Williams, Jr. | 175/334 |
| 3,156,310 | 11/1964 | Frisby | 175/76 |
| 3,324,957 | 6/1967 | Goodwin et al. | 175/67 |
| 3,365,007 | 1/1968 | Skipper | 175/61 |
| 3,451,491 | 6/1969 | Clelland | 173/44 |
| 3,525,405 | 8/1970 | Coyne et al. | 175/19 |
| 3,529,682 | 9/1970 | Coyne et al. | 175/45 |
| 3,589,454 | 6/1971 | Coyne | 175/26 |
| 3,685,601 | 8/1972 | Hollingshead | 175/318 |
| 3,746,106 | 7/1973 | McCullough et al. | 175/45 |
| 3,746,108 | 7/1973 | Hall | 175/61 |
| 3,902,563 | 9/1975 | Dunn | 175/62 |
| 4,024,721 | 5/1977 | Takada et al. | 61/72.7 |
| 4,119,160 | 10/1978 | Summers et al. | 175/67 |
| 4,154,312 * | 5/1979 | Barnetche | 175/228 |
| 4,184,553 | 1/1980 | Jones, Jr. et al. | 175/61 |
| 4,306,626 | 12/1981 | Duke et al. | 173/35 |
| 4,306,627 | 12/1981 | Cheung et al. | 175/422 |
| 4,401,170 | 8/1983 | Cherrington | 175/73 |
| 4,457,384 * | 7/1984 | Layton | 175/318 |
| 4,621,698 | 11/1986 | Pittard et al. | 175/305 |
| 4,632,191 | 12/1986 | McDonald et al. | 175/19 |
| 4,674,579 | 6/1987 | Geller et al. | 175/45 |
| 4,679,637 | 7/1987 | Cherrington et al. | 175/61 |
| 4,694,913 | 9/1987 | McDonald et al. | 175/61 |
| 4,790,394 | 12/1988 | Dickinson, III et al. | 175/61 |
| 4,834,193 | 5/1989 | Leitko, Jr. | 175/19 |
| 4,936,708 | 6/1990 | Perry | 405/184 |
| 4,945,999 | 8/1990 | Malzahn | 175/19 |
| 4,953,638 * | 9/1990 | Dunn | 175/62 X |
| 5,020,608 * | 6/1991 | Oden et al. | 175/21 |
| 5,242,026 | 9/1993 | Deken et al. | 175/62 |
| 5,289,987 * | 3/1994 | Puttmann | 175/62 X |

* cited by examiner 118A
137
238
237
239
117
147
119
118A
150
136
122
120
118
238'
239'
237
111
119
118B
117
111
113
150
137
113

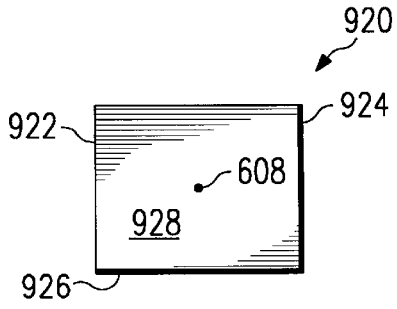
FIG. 54
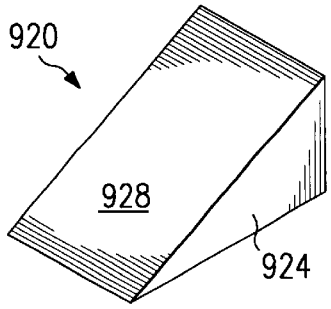
FIG. 55
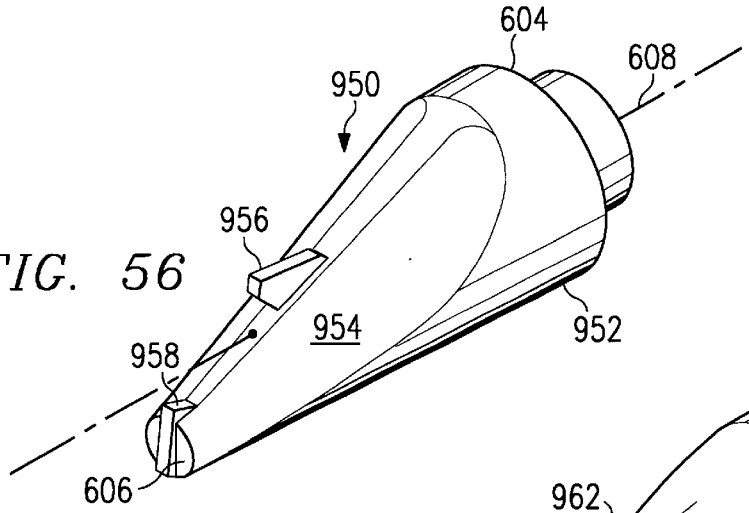
FIG. 56
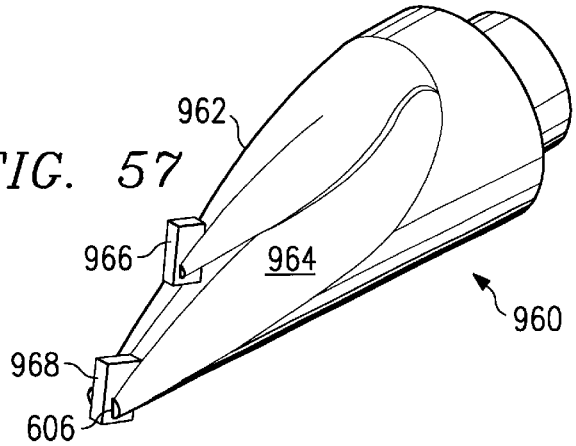
FIG. 57
FIG. 59
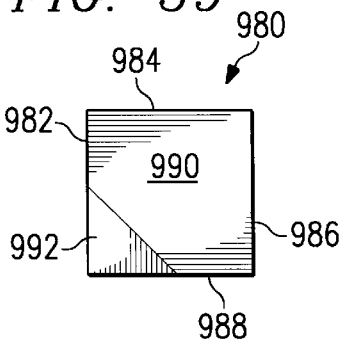
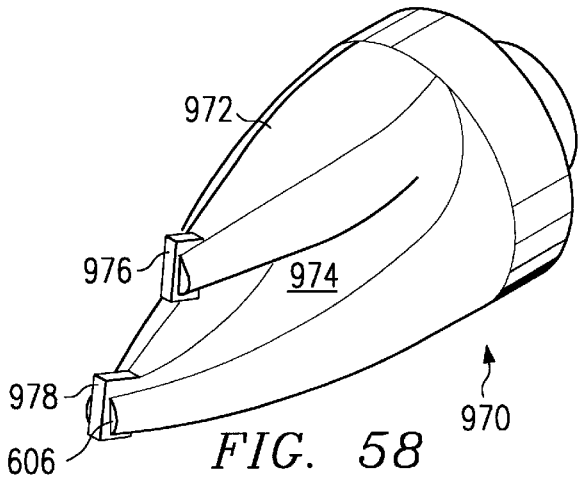
FIG. 58

DIRECTIONAL MULTI-BLADE BORING HEAD

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of application Ser. No. 08/067,298, [filed on May 25, 1993] *entitled DIRECTIONAL MULTI-BLADE BORING HEAD, filed on May 25, 1993, now U.S. Pat. No. 5,341,887, which was a continuation-in-part of application Ser. No. 857,167, entitled, METHOD OF AND APPARATUS FOR DRILLING A HORIZONTAL CONTROLLED BOREHOLE IN THE EARTH, filed Mar. 25, 1992, now U.S. Pat. No. 5,242,026, which was a continuation-in-part of application Ser. No. 575,568, entitled APPARATUS FOR DRILLING A HORIZONTAL CONTROLLED BOREHOLE IN THE EARTH, filed Aug. 31, 1990, now U.S. Pat. No. 5,148,880, which was a continuation-in-part of application Ser. No. 211,889, entitled METHOD OF AND APPARATUS FOR DRILLING A HORIZONTAL CONTROLLED BOREHOLE IN THE EARTH, filed Jun. 27, 1988, now U.S. Pat. No. 4,953,638.*

TECHNICAL FIELD OF THE INVENTION

This invention relates to a steerable fluid assisted mechanical boring head for drilling substantially horizontal boreholes under a roadway or other obstruction.

BACKGROUND OF THE INVENTION

Using boring machines with a steerable bit or head for drilling horizontal boreholes under a roadway or other obstruction is a well known practice. The process of providing such boreholes is generally referred to as "trenchless" digging, since an open trench is not required. A key to the operation of such a boring device is to have an effective steerable boring bit or head. If the bit is steerable, the operator can redirect the borehole along the proper path if it begins diverting from the desired path, and also allows the operator to steer around obstructions underground.

Many drill bits have been designed which have such a steering feature. However, there is a continuing need to develop boring bits which have better directional control, operate in a variety of soil conditions effectively and provide enhanced cutting action.

SUMMARY OF THE INVENTION

In accordance with one aspect of the present invention, a directional boring bit is illustrated which is capable of axially advancing while the drill string on which the boring bit is mounted is rotated and is capable of moving in a different direction as the drill string rotation is stopped and the drill string and boring bit are thrust forward. The directional boring bit has a body and a deflecting surface on the body at an oblique angle to the central axis rotation of the body. The directional boring bit also has at least one conically shaped rotary cutter or cone mounted thereon to assist in boring.

BRIEF DESCRIPTION OF THE DRAWINGS

FIGS. 36–59 illustrate various drill bits that can be used;

DETAILED DESCRIPTION

Figure 1:
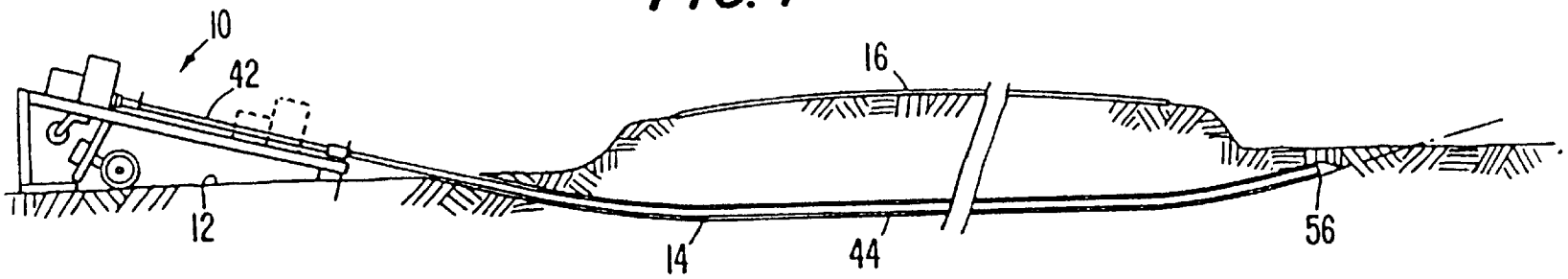
FIG. 1 is an elevational view of a boring machine as employed in practicing the method of the invention for drilling a borehole in the earth.

Referring to the drawings, and first to FIG. 1, the environment in which the apparatus of this invention is used is illustrated. The boring machine is generally indicated by the numeral 10. Machine 10 is shown resting on earth's surface 12 and in position for forming borehole 14 underneath an obstruction on the earth such as roadway 16. As shown in FIG. 1, by using extended range boring machine 10, the direction of the borehole can be changed as the borehole passes under roadway 16. This illustrates how machine 10 can be utilized to form borehole 14 under an obstruction without first digging a deep ditch in which to place a horizontal boring machine, and, also without having to dig a deep ditch on the opposite side of the obstruction where the borehole is to be received. While the method of drilling a borehole and the machine used therewith will be described as showing the borehole being drilled from the earth's surface 12, it can be appreciated that machine 10 can be used in a shallow ditch if desired. It should be kept in mind, however, that the main emphasis of the method and machine of this invention is that of drilling a borehole in which the direction of the borehole can be changed during the drilling process. These methods could be applied on other types of drilling machines as well.

Figure 2:
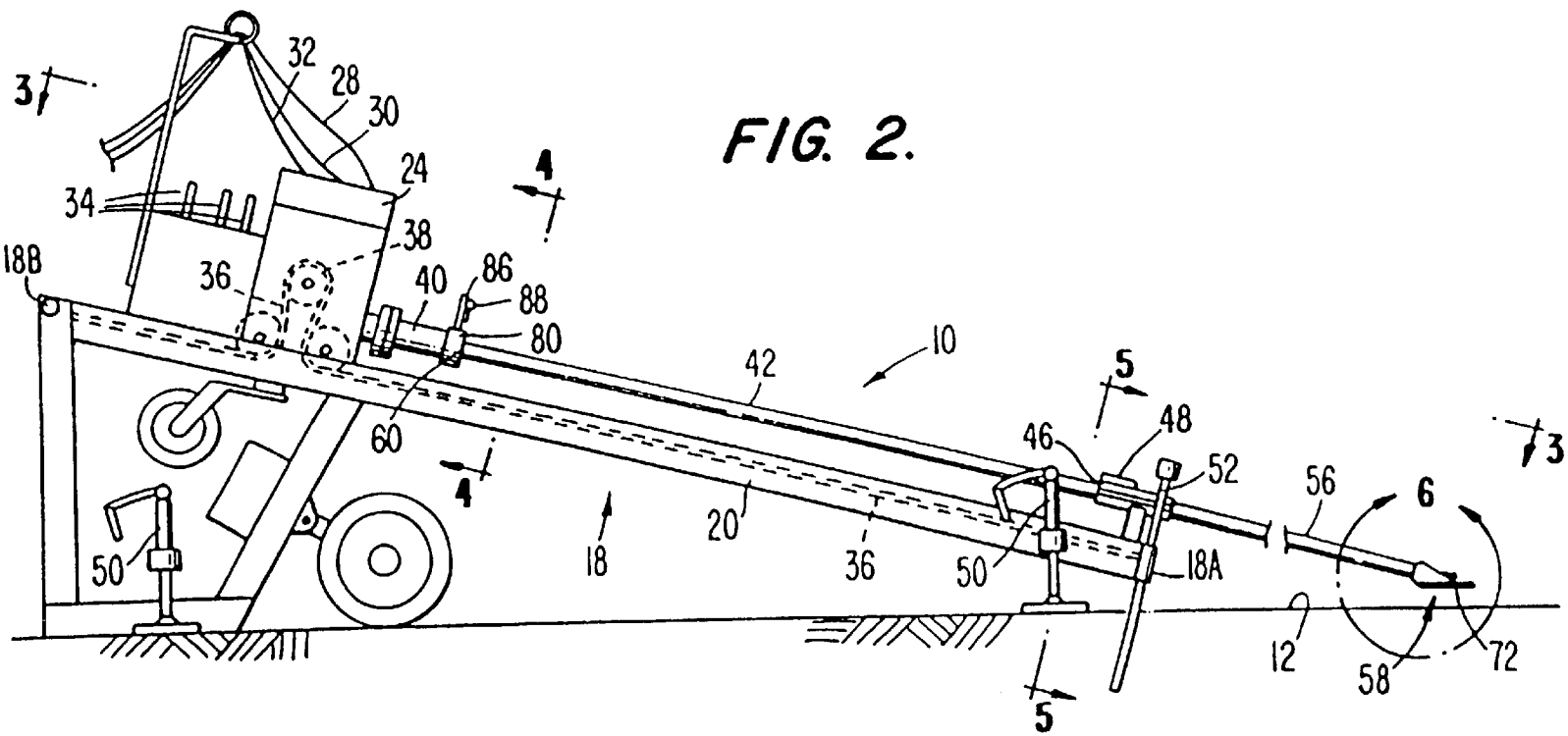
FIG. 2 is an elevational enlarged scale view of the boring machine of FIG. 1.

In conventional fashion, drill string 44 is simultaneously rotated and advanced by means of boring machine 10 to establish a borehole in the earth. The drilling operation, wherein pipe 42 of FIG. 2 is simultaneously rotated and axially advanced, is continued until a change in direction of the borehole is desired. This typically occurs when the borehole is near a desired depth and when the borehole is to be moved substantially horizontal for a distance. In order to change the direction of the borehole the-following sequence is employed:

1. The rotation of drill string 44 is stopped.

2. The rotational position of drill string 44 is oriented so that blade assembly 72, 172, 172', 272, 372, 472, 572, 672 or 772 of downhole tool 58, 158 or 358 is inclined at an acute angle relative to the longitudinal axis of the drill string and towards the new direction of the borehole desired.

3. The drill string is axially advanced without rotation to axially advance downhole tool 58, 158 or 358 a short distance such that the blade assembly moves the downhole tool in the earth towards the new desired direction.

4. Simultaneous rotation and axial advancement of the drill string is resumed for a short distance.

5. Sequentially repeat steps 1, 2, 3 and 4, until the direction of the borehole is in the new direction desired.

Thereafter, the downhole tool 58, 158 or 358 is axially advanced and simultaneously rotated until it is again desirable to change directions. This typically can occur when a borehole has reached a point adjacent the opposite side of the obstruction under which the borehole is being drilled. At this stage in the drilling of the borehole, it is desirable to have the direction of the borehole inclined upwardly so that the borehole will emerge at the surface of the earth on the opposite side of the obstruction.

To again change the direction of the borehole, the same sequence is repeated. That is, the rotation of drill string 44 is stopped, the orientation of the drill string is corrected so that the downhole tool blade assembly is inclined in the newly desired direction (that is, in this example, upwardly), the drill string is axially advanced without rotation a short distance, the drill string is then rotated and axially advanced a short distance, and the sequence is repeated until the new direction of drilling the borehole is attained. After the new direction is attained, the borehole is drilled by simultaneously rotating and advancing the drill string until the borehole is completed.

Figure 3:
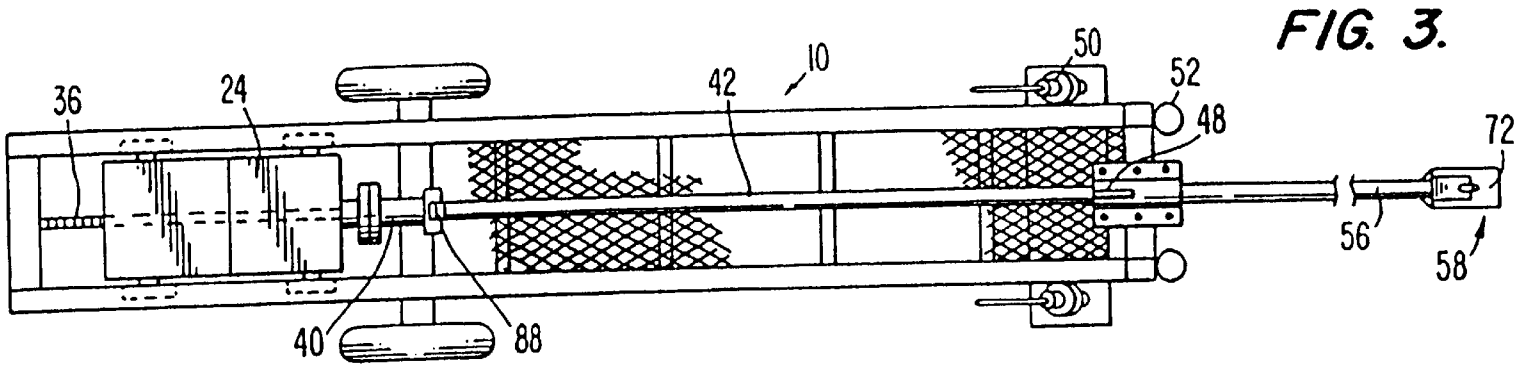
FIG. 3 is a top plan view of the boring machine of FIGS. 1 and 2 taken along line of 3—3 of FIG. 2.
Figure 5:
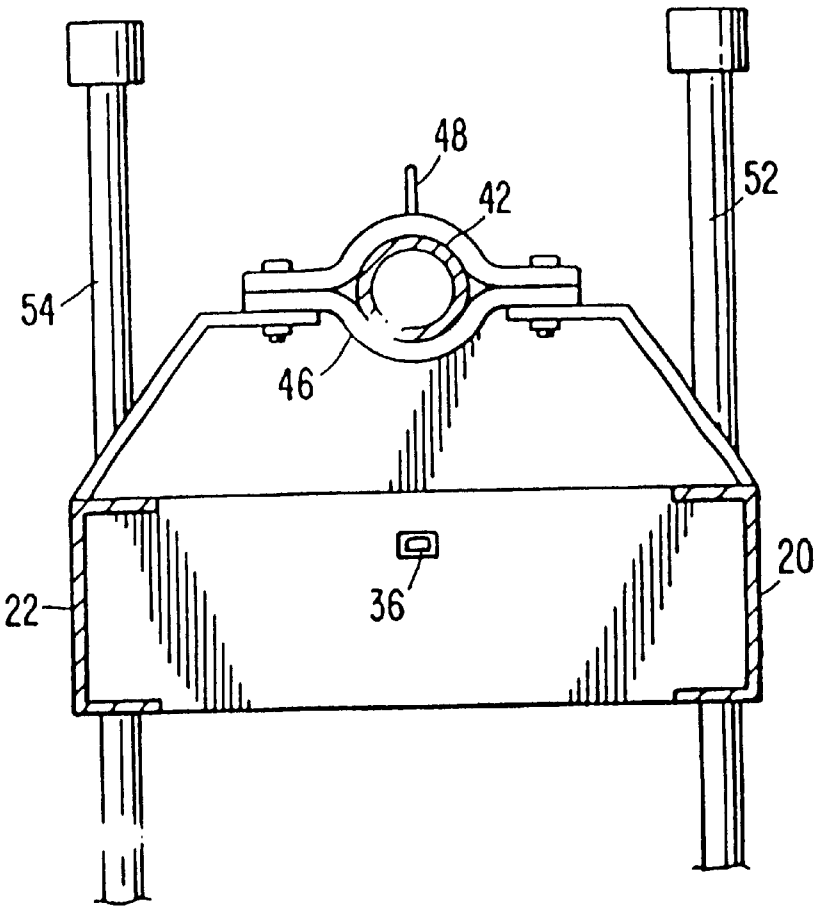
FIG. 5 is an elevational, cross-sectional, enlarged scale view taken along line 5—5 of FIG. 2 showing how the drill string is supported and rotationally oriented.
Figure 4:
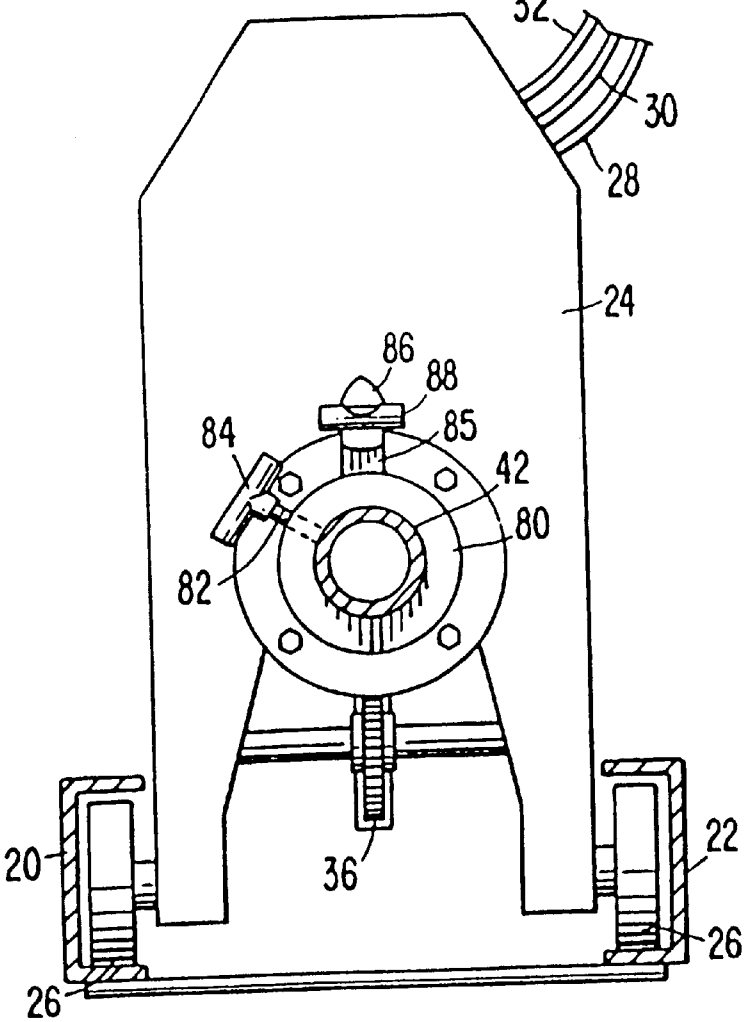
FIG. 4 is an elevational, enlarged scale view of the boring machine of FIGS. 1 and 2 taken along line 4—4 of FIG. 2.
Figures 15A, 15B, 15C:
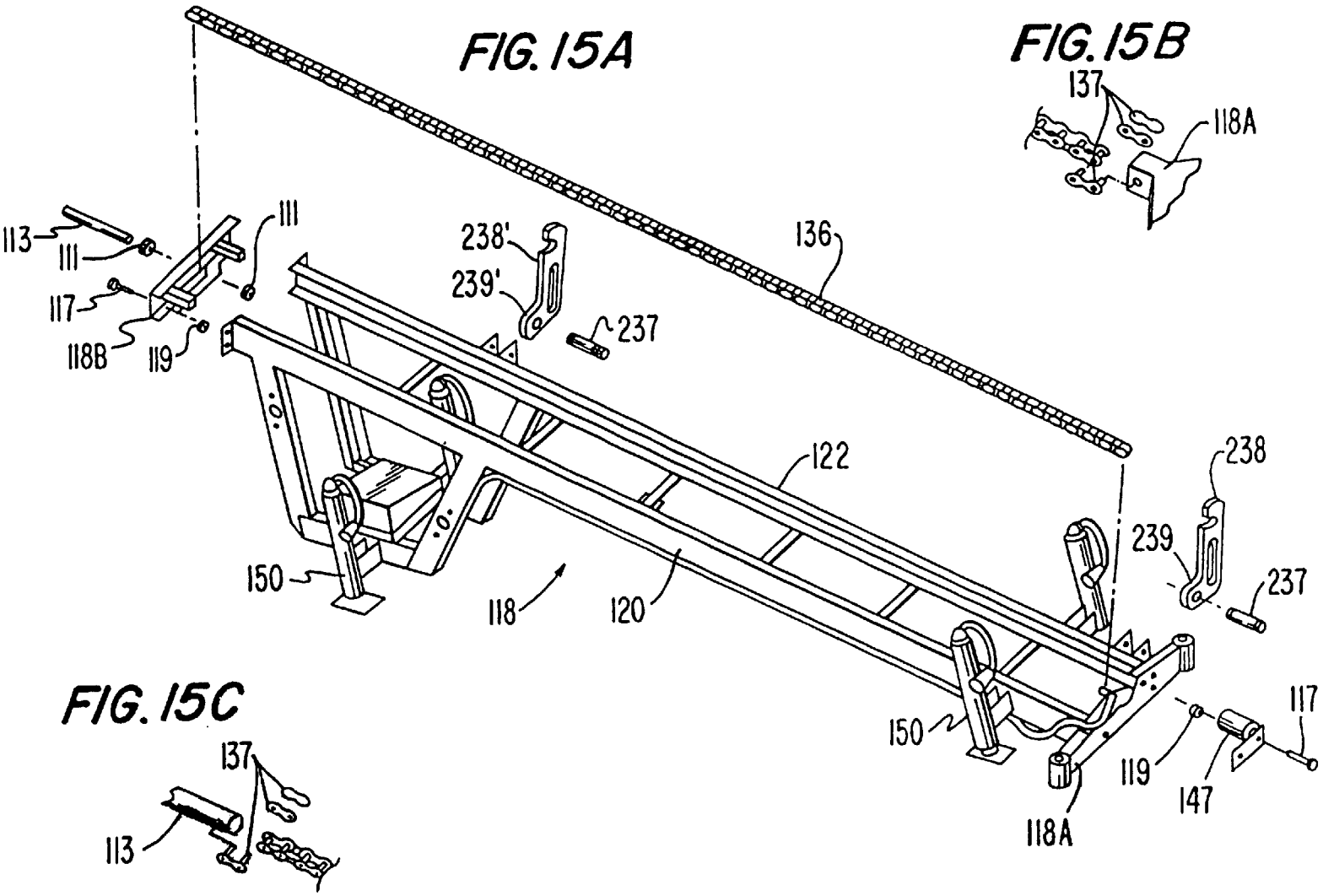
FIG. 15A is a broken away perspective view of elements associated with a frame of the second alternative embodiment of a boring machine.
FIG. 15B is a broken away partial perspective view of a connector link between a chain and forward end of the frame of FIG. 15A.
FIG. 15C is a broken away partial perspective view of a connector link between a chain and a thread of the frame of FIG. 15A.

Referring to FIGS. 2 and 3, more details of the boring machine are illustrated. In particular, machine 10, which is utilized for practicing a method of this invention, includes frame 18 having a forward end 18A and a rearward end 18B and supportable on the earth's surface. Frame 18 of FIGS. 2 and 3 and frame 118 of FIGS. 15A–15C are preferably operated from a surface launch position which eliminates the need to dig a pit. Also, frames 18 and 118 provide an elongated linear travel pathway. As best seen in FIGS. 4, 5 and 15A the linear pathway is preferably provided by spaced apart parallel channels 20 and 22 or 120 and 122.

Rotary machine 24 of FIGS. 2, 3 and 4 is supported on the frame and in the travel path. More specifically, rotary machine 24 is supported on wheels 26 of FIG. 4 which are received within channels 20 and 22.

Drill string 44 includes a plurality of drill pipes 42 each having a male thread at one end and a female threaded opening at the other end. Each pipe is attachable at one end to rotary machine 24 and to each other in series to form drill string 44. As seen in FIGS. 2 and 3, the rearward end of drill string 44 can be attached to rotary machine 24. Drill string 44 can also include adapter 230 and saver subs 232, as in FIGS. 9 and 16. Thread caps 234 and 236 are used to protect a drill pipe and are removed prior to insertion into the drill string.

Rotary machine 24 is supplied by energy such as by hydraulic pressure through hoses 28 and 30 of FIGS. 2 and 4. This hydraulic energy can be supplied by an engine drive trailer mounted hydraulic pump (not shown) which is preferably positioned on the earth's surface adjacent the drilling machine. The use of hydraulic energy is by example only. Alternatively, rotary machine or drive 24 could be operated by electrical energy, an engine or the like. The use of hydraulic energy supplied by a trailer mounted engine driven pump is preferred, however, because of the durability and dependability of hydraulically operated systems. Third hose 32 of FIGS. 2 and 4, is used for supplying fluid for a purpose to be described subsequently.

By means of control levers 34 of FIG. 2, hydraulic energy can be controlled to cause rotary machine 24 to be linearly moved in the pathway provided by channels 20 and 22 of FIGS. 4 and 5 or 120 and 122 of FIG. 15A, and at the same time to cause a drill pipe to be axially rotated. The linear advancement or withdrawal of rotary machine 24 is accomplished by means of chain 36 of FIG. 2 or chain 136 of FIG. 15A which is attached at one end to frame front end 18A or 118A and at the other end to frame rearward end 18B or 118B. Chain 36 passes over cog wheel 38, the rotation of which is controlled by one of levers 34 to connect hydraulic power to a hydraulic motor (not shown) which rotates cog wheel 38 in the forward or in the rearward direction or which maintains it in a stationary position.

As seen in FIGS. 2 and 3, extending from the forward end of rotary machine 24 is drive spindle or shaft 40 which has means to receive the male or female threaded end of drill pipe 42. Upper or uphole end 60 of the drill string is attached to shaft 40 (FIG. 2), that is, to the rotary machine 24. Saver sub 232, attached to shaft 40 with a thread retaining compound such as Loctite® RC/680 is a replaceable protector ("saver") of threads on shaft 40.

A plurality of drill pipes 42 are employed and, when the drill pipes are assembled together, they form drill string 44 as seen in FIG. 1. Drill pipes 42 are of lengths to fit a particular size drill frame 18 or 118, such as 5 feet, 10 feet, 12 feet and/or 20 feet, and when sequentially joined can form a drill string of a length determined by the length of the hole to be bored. The preferred embodiments generally have a distance capability of over 400 feet in many soil conditions.

As seen in FIGS. 2 and 5, adjacent forward end 18A of the frame is drill pipe support 46. Drill pipe support 46 maintains drill pipe 42 in a straight line parallel to the guide path formed by channels 20 and 22. The drill pipe support can include sight 48, the purpose of which will be described subsequently.

Positioned adjacent the forward and rearward ends of frames 18 or 118 are jacks 50 or 150 by which the elevation of the frame relative to the earth's surface 12 may be adjusted. In addition, at front end 18A of the frame are opposed stakes 52 and 54 which are slidably received by the frame front end. Stakes 52 and 54 may be driven in the earth's surface so as to anchor the machine during drilling operation.

Also illustrated in FIG. 15A are flange lock bolt 117 and flange lock nut 119 for attaching rearward end or rear cross-member 118B of frame 118 to channels 120 and 122. Also, as seen in FIG. 15C, thread 113 (attached to rearward end 118B by nuts 111) adjustably engages chain 136 via connector link 137. In addition, as seen in FIG. 15B, the opposite end of chain 136 also engages forward end 118A of frame 118 via second connector link 137.

Figure 8:
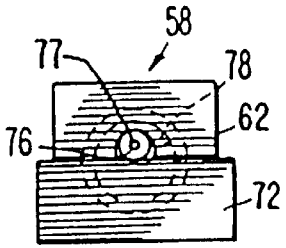
FIG. 8 is an end view of the bit of FIG. 6 taken along line 8—8 of FIG. 6.
Figure 7:
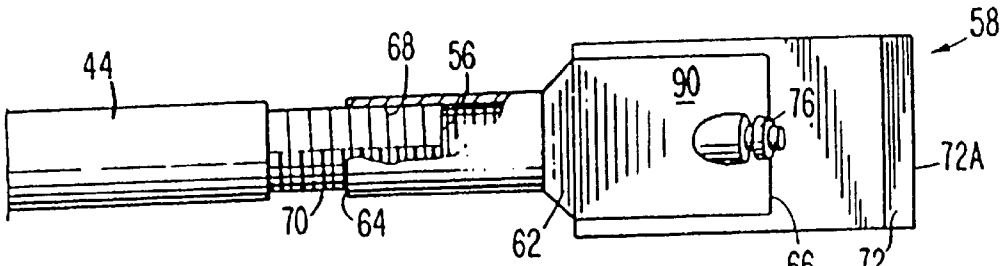
FIG. 7 is a top plan view of the bit of FIG. 6.
Figure 6:
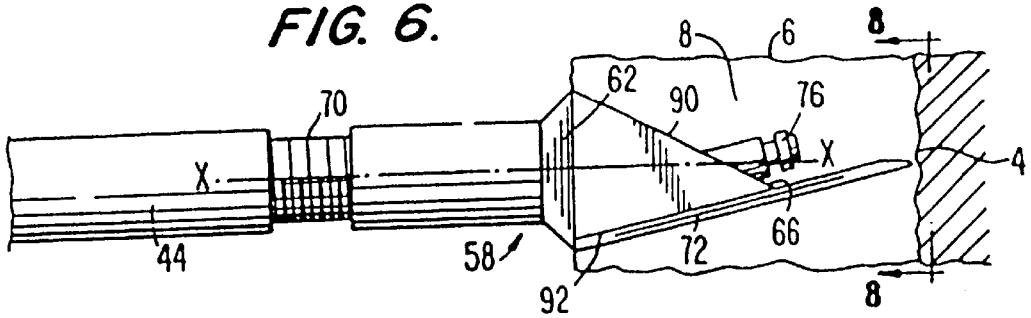
FIG. 6 is an enlarged elevational view of the boring bit or downhole tool [ or downhole tool 173 of FIG. 1 taken at (6) of FIG. 2.

Affixed to downhole end 56 of drill string 44 is a bit or downhole tool generally indicated by the numeral 58. The drill bit or downhole tool is best seen in FIGS. 6, 7 and 8.

The drill bit or downhole tool includes body portion 62 which has rearward end portion 64 and forward end portion 66. Rearward end portion 64 of drill bit body 62 includes an internally threaded recess 68 which receives the external threads 70 of drill string forward end 56.

Blades or blade assemblies 72, 172, 172', 272, 272', 372, 472, 572, 672 and 772 can be affixed to drill bit or downhole tool bodies 62, 162 or 362. The plane of blade assemblies 72, 172, 172', 272, 272', 372, 472, 572, 672 and 772 are inclined at an acute angle to axis X—X of the bit's internally threaded recess 68. Axis X—X is also the longitudinal axis of drill string 44 or forward most drill pipe 42. That is, axis X—X is the axis of the portion of the drill string immediately adjacent and rearwardly of the downhole tool.

Figure 23:
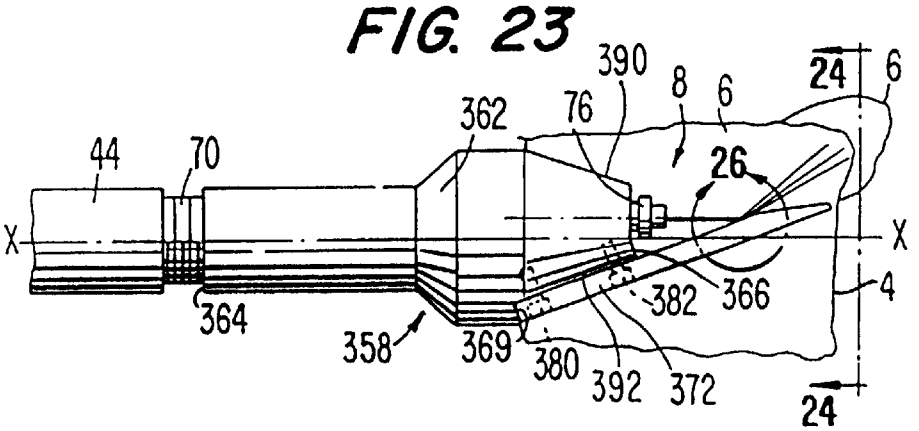
FIG. 23 is an enlarged elevational view of a third alternative embodiment of a downhole tool and of a portion of a drill string.

The blade assemblies are preferably sharpened at their outer forward ends 72A, 172A, 272A, 372A, 472A, 572A, 672A and 772A. When rotated, the blade assemblies cut a circular pattern to form walls 6 or 6' at end 4 of borehole 14 as illustrated in FIGS. 6 and 23.

Bodies 62, 162 and 362 have fluid passageway 78 therethrough connecting to jet or nozzle 76. Fluid passageway 78 is in turn connected to the interior of tubular drill string 44. As previously stated with reference to FIG. 2, hose 32 provides means for conveying fluid under pressure to boring machine 24. This fluid is connected to the interior of drill pipe 42 and thereby to the entire drill string 44, and, thus, to the interior of bodies 62, 162 and 362. The fluid is ejected from tool bodies 62, 162 and 362 through nozzle 76 to aid in the drilling action. That is, fluid is ejected from nozzle 76 to cool and lubricate blade assemblies 72, 172, 172', 272, 272', 372, 472, 572, 672 or 772 and flush away cuttings formed by the blade as it bores through the earth by forming a slurry of cuttings.

Nozzle 76 in this case refers to any of a plurality of fluid nozzles designed for different soil conditions. For example, one can use one nozzle for soft dirt or hard dirt and then interchange that with another nozzle for sand. Also, one can interchange nozzles to vary the flow rate.

As best seen in FIGS. 6 and 7, blade assembly 72 includes an outer surface which is substantially flat. Also, blade assembly 72 is rectangular as illustrated.

The preferred downhole tool improves the ability to make rapid steering corrections. Downhole tool body 62, 162 and 362 include a tapered portion, between the rearward end 64 and the forward end 66, which tapers toward the forward end of the drill body. Also, this surface of the drill body defines an outer surface which is free of cutters, except for the blade.

Although not necessary, downhole tool body 62 has a substantially triangular cross-section defined by a converging flat top surface 90 and flat bottom surface 92. Also, blade assembly 72 is fixed to the bottom flat surface of the drill bit body and extends axially beyond forward end 66 of body 62 at an acute angle. This angled extension, in conjunction with converging top surface 90 of the drill bit body, defines relief space 8 in which fluid nozzle 76 is positioned. In use, relief space 8 will form a cavity in the borehole which will facilitate rapid steering corrections. Thus, the structure in FIG. 6 illustrates this acute angle of the blade assembly and the tapered portion of the drill body having the uniquely advantageous function of defining a relief area or space 8 of reduced axial resistance near forward end 4 of borehole 14 to thereby allow for rapid deviation of the borehole from a straightline when downhole tool 58 is thrust forward without rotation.

Although the invention provides an improved rapid steering correction function in a downhole tool with both a blade assembly and a fluid jet or nozzle, it is not necessary, though, in certain circumstances to have a fluid jet to still achieve the desired advantageous functions. A preferred structure, however, is blade assembly 72 having an outer surface which is substantially flat and tool body tapered portion which defines an outer surface of the tool body from which only the blade assembly 72 and nozzle 76 project from.

When a change of direction of the drill pipe is desired, rotation is stopped and the drill pipe is advanced axially without rotation. However, in certain soils or ground conditions, it is very difficult to move the drill pipe forward without rotation. The relief area 8 shown in FIGS. 6 and 23 which is created by the structure of the drill bit allows for reduced axial resistance at least over the relief area when drill string 44 is advanced without rotation. This relief area 8 of reduced axial resistance may be all that is needed to provide for rapid or sudden steering corrections. In some soil or boring situations, however, it may be necessary to incrementally repeat the rotation and push cycle to get the proper steering correction to form walls 6 of borehole 14 along a curved path as in FIG. 1 or some other desired path. The present invention, thus, provides for improved rapid steering correction which is not available with known prior art devices.

An orientation directional indicator may be secured to the drill string adjacent the drill machine so that the angle of the plane of the drill bit body can at all times be known. Referring back to FIGS. 2 and 4, a device which is utilized to indicate the rotational orientation of drill string 44, and thereby the rotational orientation of drill bit or downhole tool 58, is shown. Ring member 80 is slidably and rotatably received on drill pipe 42. The ring has a threaded opening therein receiving set screw 82 having handle 84. When the set screw 82 is loosened, ring 80 can be slid on drill pipe 42 and rotated relative to it.

Affixed to ring 80 is bracket 85 having pointer 86. In addition to pointer 86, bracket 85 carries a liquid bubble level 88.

The function of ring 80 with its pointer and bubble level is to provide means of maintaining the known orientation of the drill string 44. When a drilling operation is to start, the first length of drill pipe 42 is placed in the machine and bit or tool 58 is secured tightly to it. At this juncture, the tool is above ground and the operator can easily observe the orientation of blade assemblies 72, 172, 172', 272, 272', 372, 472, 572, 672 or 772. The operator can then affix ring 80 so that it is in accurate orientation with the blade, that is, as an example, ring 80 is affixed so that pointer 86 points straight up with the blade aligned so that a plane drawn perpendicular to the plane of the blade would be vertical. With ring 80 so aligned, set screw 82 is tightened by handle 84. Thereafter, as drill pipe 42 is rotated and advanced into the earth, ring 80 remains in the same axial rotation orientation, rotating with the drill string. As the drill string is advanced by the advancement of machine 24 towards forward end 18A of the boring machine frame, ring 80 moves with it. It can be seen that when the boring machine has advanced so that shaft 40 is adjacent the frame forward end, drilling must be stopped and a new length of pipe 42 inserted. With drilling stopped, drill string 44 can be aligned with pointer 86 in alignment with pointer 48 affixed to drill pipe support 46. Ring or collar 80 may then be removed and inserted on a new length of drill pipe 42 threadably secured to the drill string and the procedure continually repeated, each time tightening set screw 88 so that the alignment of the blade is always known to the operator.

To form borehole 44 in the earth, the operator attaches the drill pipe and drill bit as shown in FIG. 2, begins rotation of the drill pipe and at the same time, by means of control levers 34, causes rotary machine 24 to linearly advance in the travel path of the frame towards the forward end 18A or 118A of frame 18 or 118. Drill bit 58, rotating and advancing, enters the earth and forms a borehole therein. As long as bit 58 is rotated as it is advanced, the borehole follows generally the axis of the drill pipe. That is, the borehole continues to go straight in the direction in which it is started.

In the most common application of the invention wherein the borehole is started at the earth's surface to go under an obstruction such as a highway, the borehole must first extend downwardly beneath the roadway. When the borehole has reached the necessary depth, the operator can then change the direction of drilling so as to drill horizontally. This can be accomplished in the following way: When it is time to change direction, the operator stops drilling and orients the drill string so that drill bit blade assembly 72, 172, 172', 272, 272', 372, 472, 572, 672 or 772 is oriented in the direction desired. In the illustrated case of FIG. 1, the borehole is first changed in the direction so that instead of being inclined downwardly, it is horizontal. For this purpose the operator will stop drilling with drill string 44 having collar pointer 86 pointing straight up, that is, with bracket 84 in the vertical position. With rotation stopped and the drill string properly oriented, the operator causes rotary machine 24 to move forwardly without rotating the drill pipe. After forcing the bit a foot or two (or as far as possible, if less), the operator begins rotation of the drill bit and continues to advance the drill string for a short distance.

After a short distance of rotary boring, the procedure is repeated. That is, the drill string is reoriented so that the operator knows the inclination of blade assembly 72, 172, 172', 272, 272', 372, 472, 572, 672, or 772 and then he advances the tool a short distance as above described without rotation and repeats the procedure. The procedure may be repeated sequentially for a number of times until the direction of drilling has changed to that which is desired. The opposite steering correction will have to be applied just prior to the bit reaching the desired path in order to prevent or minimize any overshooting of that path. After the borehole has been oriented in the desired direction, such as horizontal, the drilling can continue by simultaneous rotation and advancement of drill string 44, adding new links of drill pipe 42 as necessary until it is again time to change the direction of drilling, such as to cause the borehole to be inclined upwardly towards the earth's surface after the borehole has reached the opposite of the extremity of the obstruction under which the borehole is being placed. This is achieved as previously indicated; that is, by orienting drill string 44 to thereby orient the blade assembly, advancing the downhole tool without rotation of drill string 44, rotating and advancing the drill string for a short distance, reorienting the drill bit or tool and advancing without rotation and sequentially repeating the steps until the new direction of drilling is achieved.

The experienced operator soon learns the number of sequences which are normally required in order to achieve a desired direction of drilling.

Thus, it can be seen that a method of drilling provided by the present disclosure is completely different than that of the typical horizontal boring machine. The necessity of digging ditches to the opposite sides of an obstruction in which to place a horizontal boring machine is avoided.

The structure of FIGS. 9–35, which disclose alternative embodiments for a boring system, will now be described in greater detail. Shown in FIGS. 9–22 is a second embodiment of a drill string assembly and a second embodiment of a downhole tool body. Downhole tool body 162 of FIGS. 10–14 at least differs from body 62 of the embodiment of FIGS. 1–8 in that the jet is no longer at an acute angle to the centerline of the longitudinal axis of the drill string 557 and the blade assembly is now removable. If a difference is not identified between embodiments, the elements described herein to operate boring machine 10 can be used in the latter discussed embodiments.

As seen from the combination of FIGS. 9–14 and 3–28, downhole tool bodies 162 and 362 have fluid nozzle 6 fixed to the fluid passageway and positioned behind a forward end 72A, 172A, 272A, 372A, 472A, 572A, 672A and 772A of the blade assembly. Nozzle 76 can project from a nozzle receiving portion either on or adjacent top 190 and 390 of the outer surface of the bodies 162 and 362. Nozzle 76 can also be recessed into the nozzle receiving portion of the tool body.

Top surface 190 of body 162 is preferably 20° to the longitudinal axis X—X of the drill pipe. It can be appreciated that other types of nozzles or jet orifices could be employed.

Nozzle 76 on bodies 162 and 362 has a centerline Y—Y substantially parallel to the longitudinal axis X—X of drill pipe 42. Preferably, as most clearly seen in FIG. 28, nozzle 76 is displaced laterally from the longitudinal axis X—X of drill pipe 42 so that a fluid stream is emittted above the blade. Also, nozzle opening or orifice 77 size is governed by factors such as pump capacity, fluid viscosity and flow rate desired downhole.

Blade assemblies 72, 172, 172', 272, 272', 372, 472, 572, 672 and 772 include an outer surface which is substantially flat. Blade assemblies 172, 172', 272, 272', 372, 472 572, 672 and 772 are removably mounted on the tapered portion of the downhole tool body so that the blade assembly is at an acute angle to the longitudinal axis X—X of the drill pipe and the blade assembly is extending beyond the forward end 166 and 366 of the downhole tool bodies 162 and 362. Having removable blade assemblies means that the blade can be replaceable without having to replace the body. This results in substantially, lower operating cost. Also one obtains versatility, because one can use a variety of cutter blade assemblies for trenchless installations in various soil types without having to invest in a plurality of downhole tools.

The means for mounting removable blade assemblies is especially important, because of the high stress which these blades undergo. A preferred mode for mounting a removable blade assembly includes having apertures on blade assembly receiving surfaces 192 and 392 of the outer surface of the tool body and having corresponding apertures on the blade assemblies. Also, the blade assemblies are preferably disposed directly adjacent and flush mounted with shouldered sections 169 and 369 of tool bodies 162 and 362. Furthermore, shouldered sections 169 and 369 are preferably at an angle 10° to a line perpendicular to axis X—X.

Figure 10:
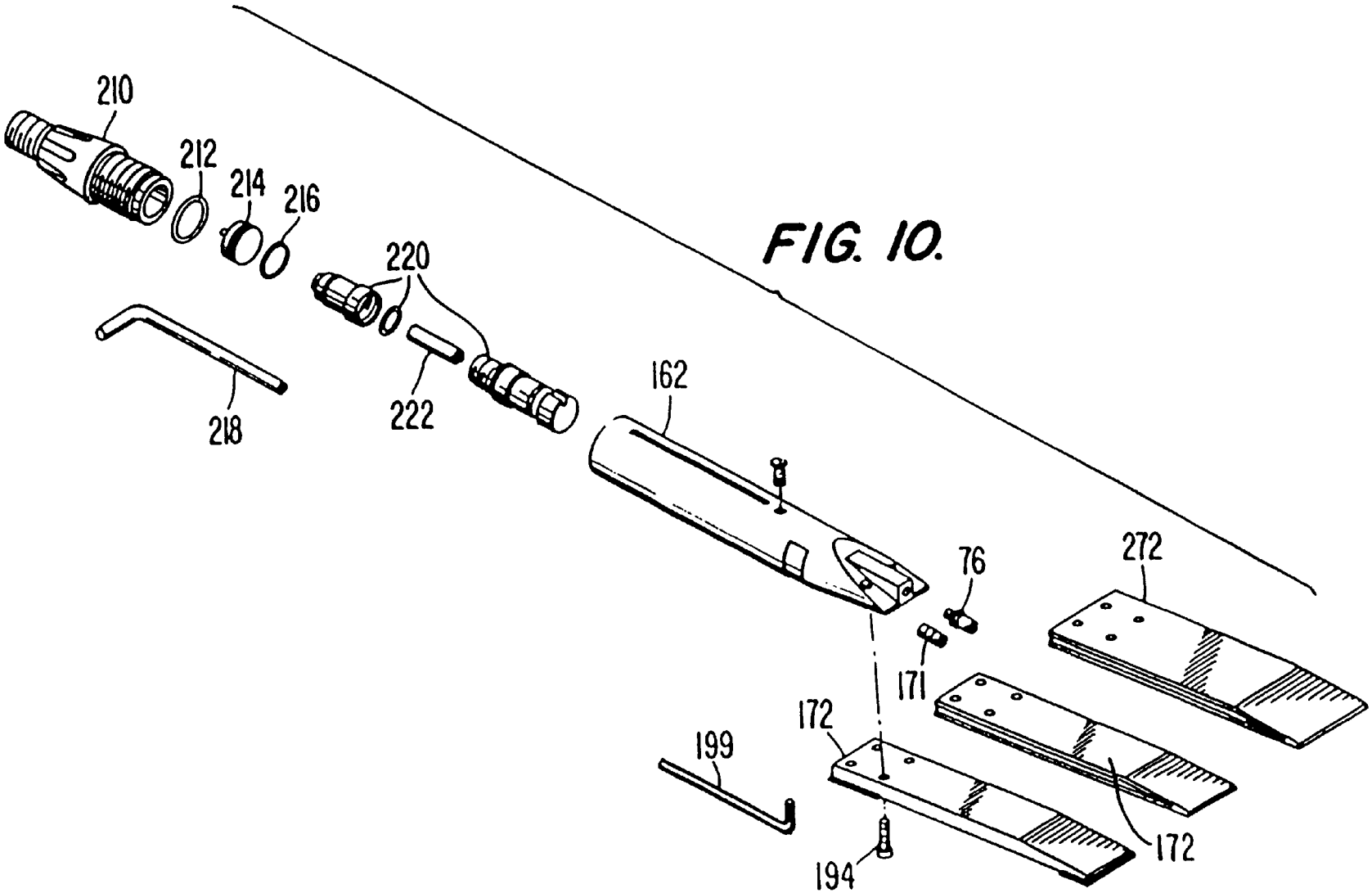
FIG. 10 is a broken away perspective view of elements associated with the second alternative downhole tool body of FIG. 9.
Figure 25:
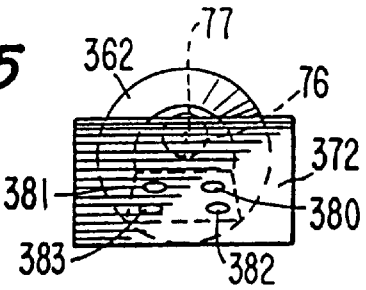
FIG. 25 is a front view of the tool of FIG. 23 taken along line 25—25 of FIG. 23.

Apertures on body 162 are identified as elements 180–183 in FIGS. 11–14 and apertures on body 362 are identified as elements 380–83 in FIGS. 23 and 25. Apertures on blade assembly 172 are identified as elements 175 and 177–79 in FIG. 17. Apertures on blade assembly 272 are identified as elements 275 and 277–279 in FIG. 19. Also, apertures on blade assembly 572 are identified as elements 575 and 577–9 in FIG. 29, apertures on blade assembly 672 are identified as elements 675 and 677–79 in FIG. 32, and apertures on blade assembly 772 are identified as elements 775, and 777–79 in FIG. 34. As seen in FIG. 10, each blade assembly is removably mounted on the downhole tool body by means of a plurality of bolts 194 mounted through the corresponding apertures and substantially flush with an outer surface of the blade. Preferably bolts 194 are coated with a thread retaining compound, such as Loctite® 242, and torqued to 40 ft.-lbs. by wrench 199.

Figure 17:
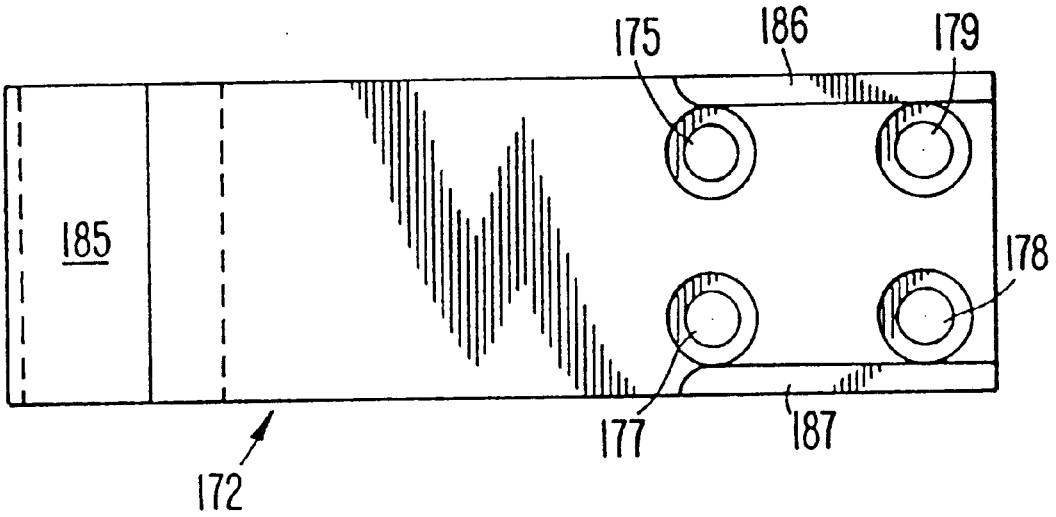
FIG. 17 is a bottom view of a dirt blade assembly of FIG. 10.
Figure 18:
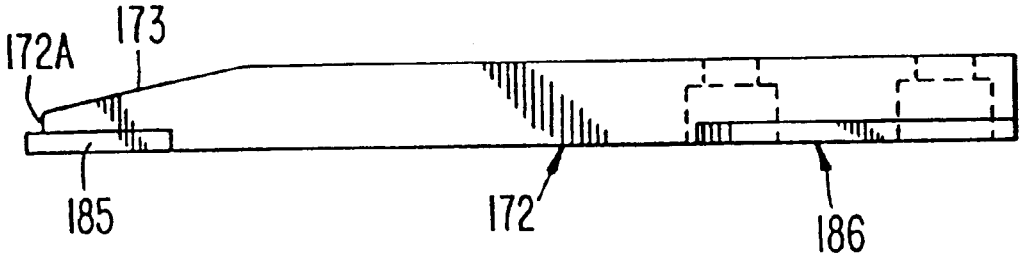
FIG. 18 is a side view of the dirt blade assembly of FIG. 17.

Different types of removable blade assemblies are preferred. One blade type, represented by preferred blade assemblies 172 and 172' in FIGS. 10, 17 and 18, is for cohesive soils and soils that offer a reasonable amount of steering resistance. Thus, blade assemblies 172 and 172' are primarily for dirt/clay conditions. Blade assembly 172 is preferably 2¼ inches wide, 7 inches long and ½ inch thick and preferred for dry/hard clay. Alternative blade assembly 172' is slightly wider at 2½ inches. The wider blade assembly 172' would be preferable for less resistant applications such as moist or soft dirt/clay conditions. The wider blade assembly is more advantageous in these softer dirt applications, because the wider the blade assembly the more steering force one obtains.

Even wider 3" blade assemblies 272 or 272' of FIGS. 19–22 are preferred for sandy soils and other loose soils of little resistance. In these sandy soils, a big surface area blade assembly is desired. The additional width provides improved steering response.

Wear resistant material is added in selective areas of the blade assemblies for additional durability. As seen in FIGS. 17 and 18, blade assembly 172 includes wear resistant material 185 such as a carbide strip on the underside of forward portion 173 of the blade. Blade assembly 172 also includes wear resistant material 186 and 187 adjacent the underside rear portion of the blade as seen in FIGS. 17 and 18.

Figure 19:
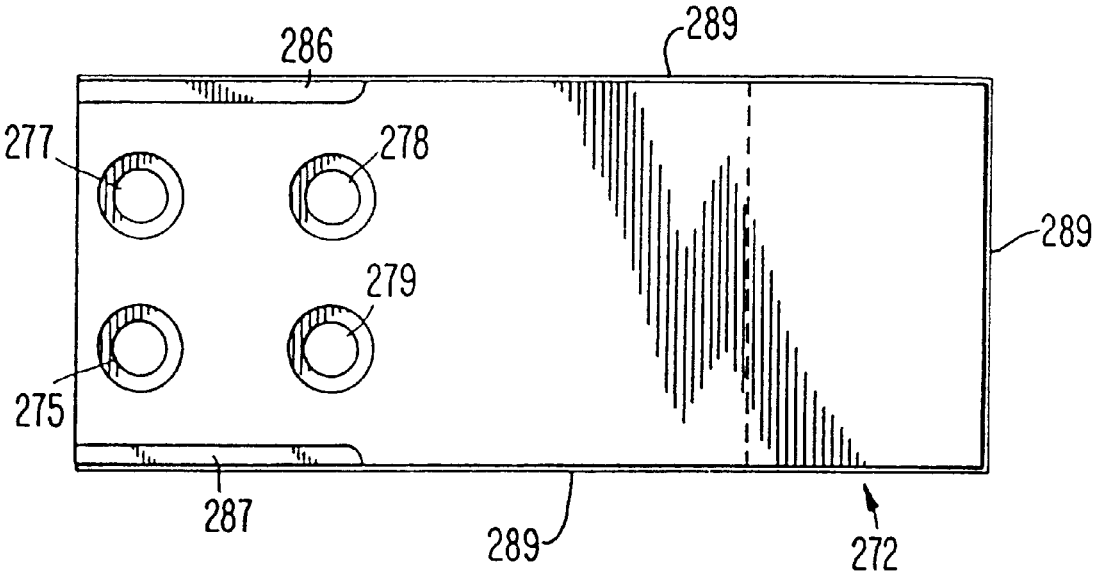
FIG. 19 is a bottom view of the sand blade assembly of FIG. 10.
Figure 20:
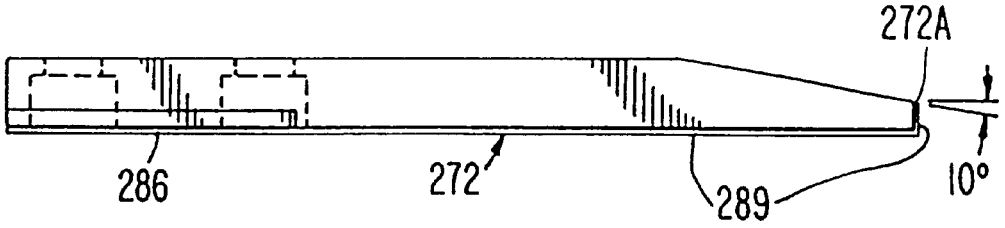
FIG. 20 is a side view of the sand blade assembly of FIG. 19.

Alternatively, one can place a weld bead 289 (of harder surface material than the blade) on the forwardmost portion of the blade and down the edges of the blade as seen in FIGS. 19 and 20. Basically, it is preferred that all blade assemblies have either the weld bead or hard facing strips such as carbide on three edges as shown. It is not desired, though, that the carbide strips and weld beads be mixed on a blade assembly. Note, however, if the soil has any rock content, use of carbide strips on the blades is preferred.

Figure 21:
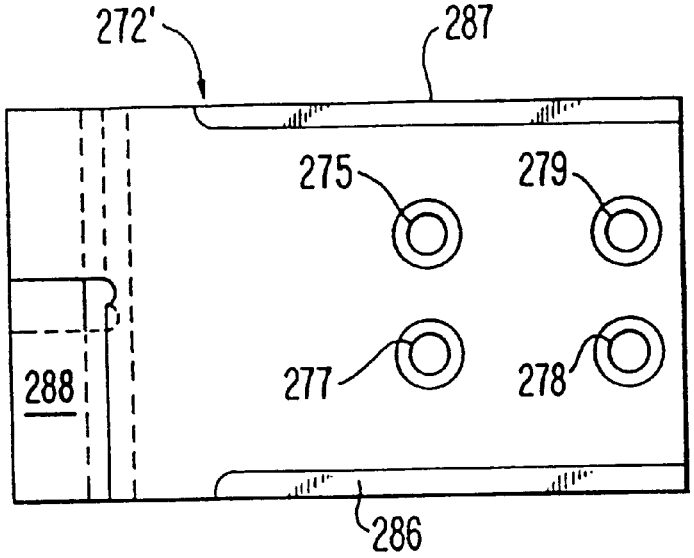
FIG. 21 is a bottom view of an alternative sand blade assembly.
Figure 22:
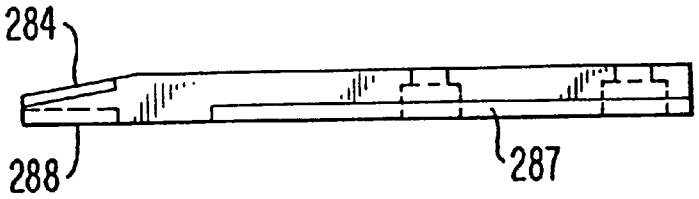
FIG. 22 is a side view of the sand blade assembly of FIG. 21.

Seen in the alternative 3" blade assembly 272' of FIGS. 21 and 22 is a more preferred location for hard surfacing on a forward portion of the blade. As seen in FIGS. 21 and 22, the forward portion of the blade includes strips 284 and 288 of harder surface material (i.e., carbide) than the blade which are disposed in recesses on portions of the surfaces of the blade. In particular, strip 288 is disposed on a right-hand side portion of the bottom or outer side of the blade when facing endwall 4 of borehole 14 and strip 284 is on a left-hand side portion of the top or inner side of the blade when facing endwall 4 of borehole 14. With clockwise rotating (when looking in the direction of boring) of the blade assembly, the preferred location of hard surfacing in FIGS. 21 and 22 is more effective in protecting both front corners of the blade assembly. Consequently, the strips are provided on the portions of the surfaces of the blade assembly which have the primary contact with the earth when the tool body is simultaneously rotated and axially advanced.

Figure 32:
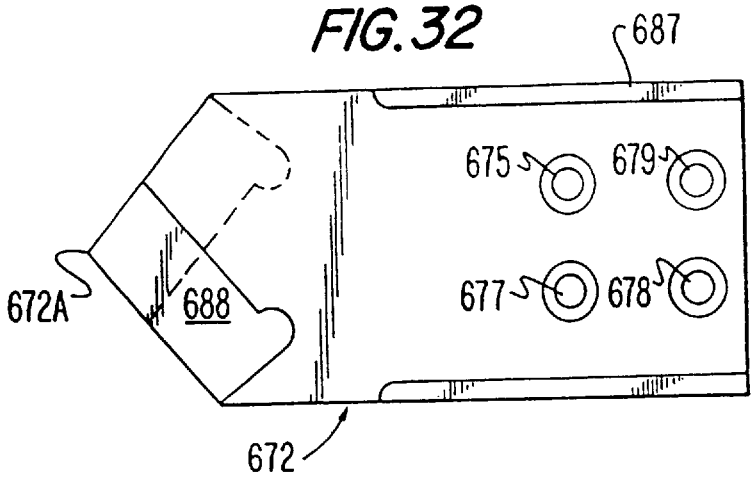
FIG. 32 is a bottom view of a spade-like blade assembly.
Figure 33:
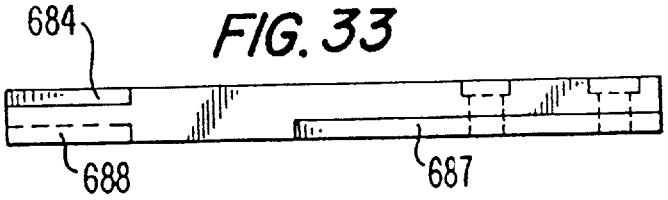
FIG. 33 is a side view of the spade-like blade assembly of FIG. 32.

It is also preferred that the recesses and the strips of harder surface material in the recesses cross a centerline of the blade assembly as seen in FIG. 21. This double reinforcement at the centerline of the blade assembly is particularly advantageous where the blade and carbide strips 684 and 688 define a spade-like profile in the forward portion of blade assembly 672 as seen in the blade of FIGS. 32 and 33.

In addition, as seen in FIGS. 21 and 22, blade assembly 272 includes hard surface material 286 and 287 in the rear portion of the blade assembly. This wear resistant material is preferably either brazed or welded onto the blade.

Figure 11:
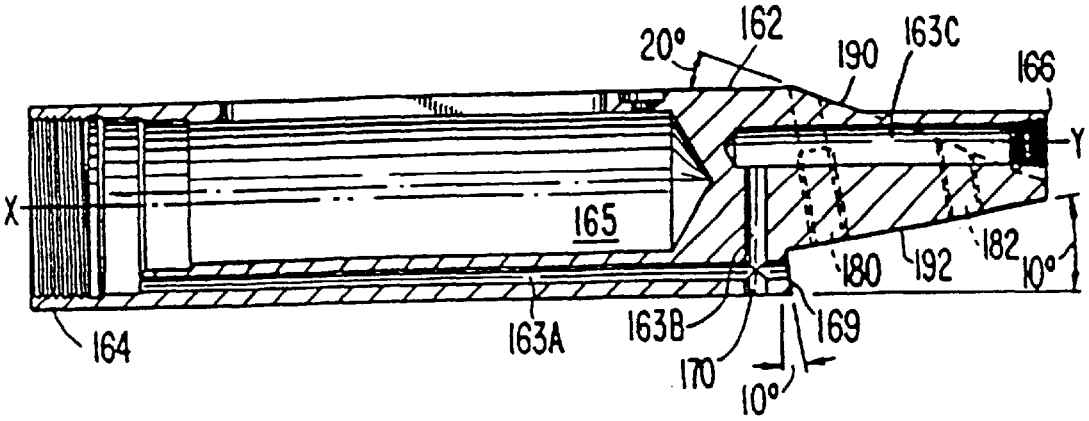
FIG. 11 is a side sectional view of the downhole tool body of FIG. 10.
Figure 12:
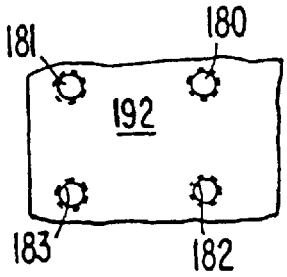
FIG. 12 is a cut-away view of the bottom flat surface of the downhole tool body of FIGS. 10 and 11.
Figure 13:
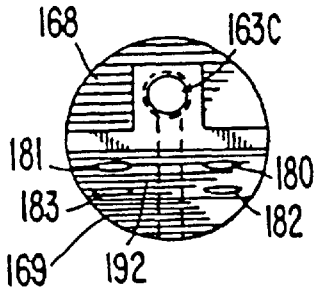
FIG. 13 is a front view of the downhole tool body of FIGS. 10 and 11.
Figure 14:
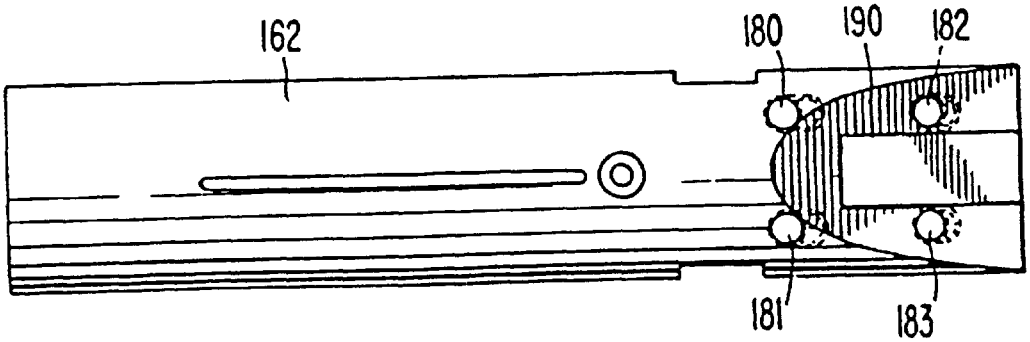
FIG. 14 is a top view of the downhole tool body of FIGS. 10 and 11.

Downhole tool body 162 includes a forward end 166 and rearward end 164 having an aperture including threads for engaging a drill pipe. As seen in FIG. 11, an intermediate portion of tool body 162 has cavity 165 for receiving a transmitter and first fluid passageway 163A.

As can be appreciated from FIGS. 10 and 11, transmitter 220 is disposed in cavity 165 of the intermediate portion of the body. Pulling tool or wrench 218 is preferably used to install transmitter 220 in cavity 165. Transmitter 220 produces an electromagnetic signal which allows the position and depth of tool body 162 to be determined by use of an above-ground receiver.

The rotational orientation of blade assembly 172 et al., must also be known when advancing without rotation to make course direction changes. An angle or roll sensor, such as those known in the art, can be used in conjunction with the above transmitter/receiver system to determine blade rotational orientation or aid in positioning the blade assembly at a particular desired orientation. Although downhole roll sensing is preferred, tophole drill string indicating means, such as described in the parent U.S. application Ser. No. 07/211,889, may be employed to determine blade orientation.

Removable plug 214 of FIG. 10 is disposed on a rearward portion of cavity 165 of the intermediate portion of the body. Plug 214 is also installed with pulling tool or wrench 218. The plug is waterproof and it is positioned in the body for diverting pressurized fluid from drill string 44 to first passageway 163A of the intermediate portion of the tool body. In other words, as the fluid comes down the center of fluid pipe (i.e., drilling cap) 210 in FIGS. 9 and 10, the fluid path is deviated as it hits plug 214. The fluid path is diverted downward through first passageway 163A of tool body 162 of FIG. 11. An advantage of this arrangement is that plug 214 is removable. Thus, one can get into body 162 or 362 to replace battery 222 of transmitter 220. Also, while performing a fluid deviating function, the plug protects the transmitter from fluid. Consequently, an additional advantage of this structure is that it allows the on-board transmitter to be disposed very close to the drill bit.

The downhole tool further comprises O-rings 212 and 216 adjacent each end of plug 214. Also, adjacent the forward end of the tool body is second fluid passageway 163B and third fluid passageway 163C. Second passageway 163B is in fluid communication with and substantially perpendicular to first passageway 163A. Third passageway 163C is in fluid communication with and substantially perpendicular to second passageway 163B. It would be understood by one of ordinary skill in the art that the passageway adjacent the connection of first passageway 163A with second passageway 163B would be tightly sealed at shouldered section 169 and at outer end 170. Also, as can be appreciated from FIGS. 9–11, fluid nozzle 76 is fixed to the fluid passageway and associated with forward end 166 of body 162.

Figure 9:
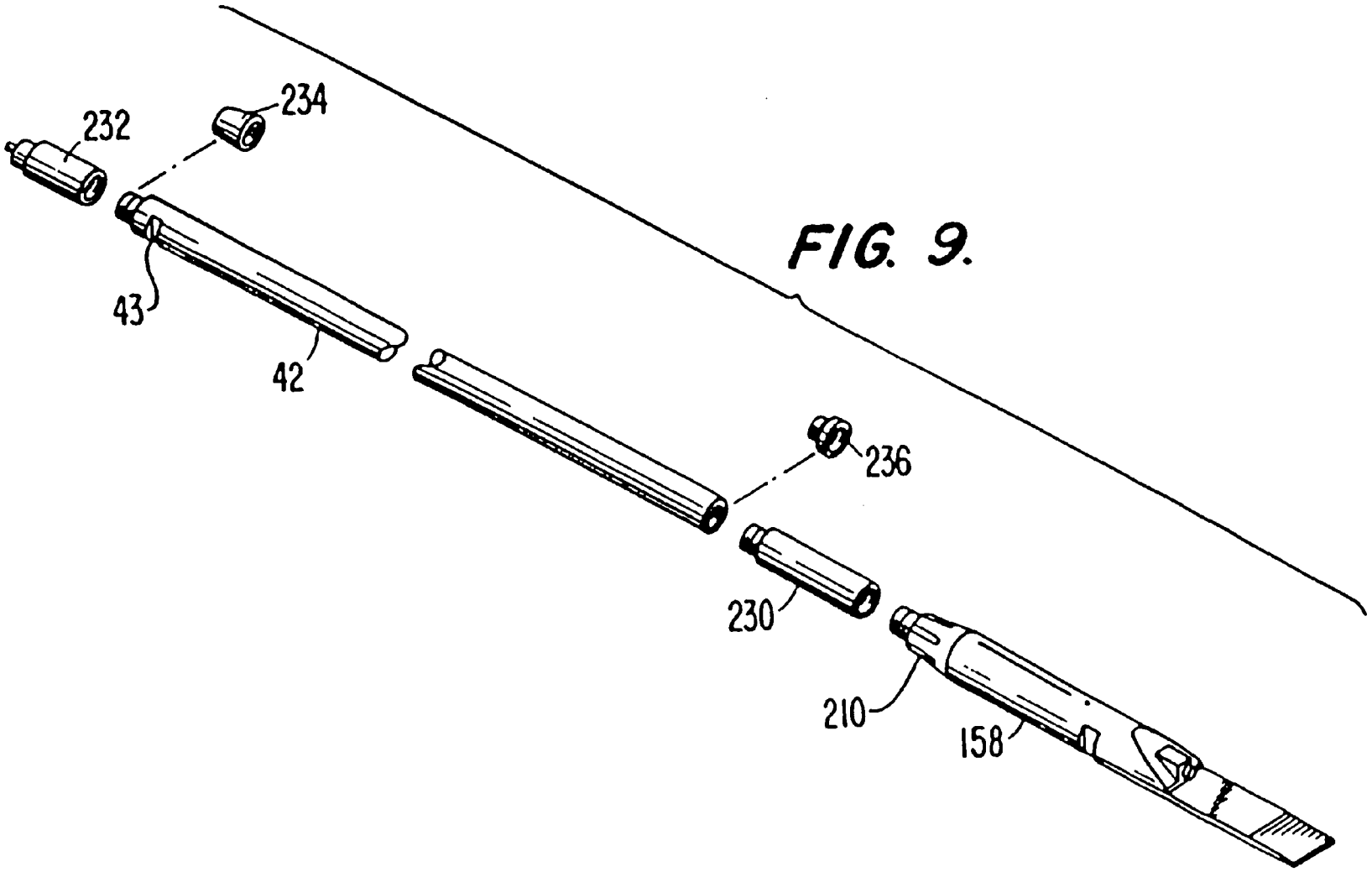
FIG. 9 is a broken away perspective view of elements associated with a second alternative embodiment of a boring machine including a second alternative embodiment of a downhole tool body.
Figure 16:
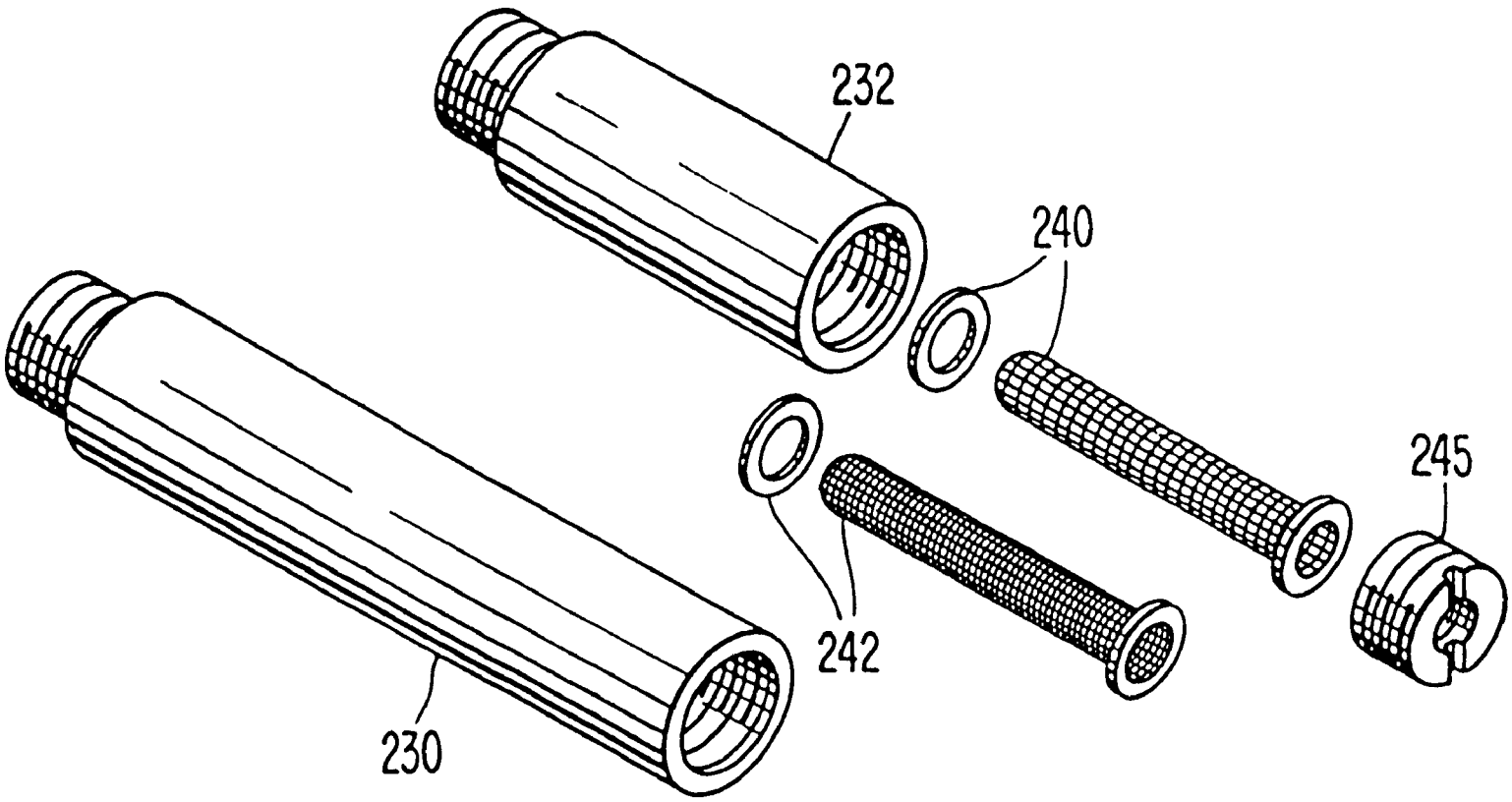
FIG. 16 is a broken away perspective view of a saver sub and an adapter assembly for a drill string.

FIGS. 9, 10 and 16 illustrate elements for an arrangement wherein nozzle 76 or the like is actually moved up the drill string and inside saver sub 232 or inside adapter 230. In particular, drill string 44 includes a channel for transferring fluid from the exterior of the borehole to the front of the drill string. In FIG. 10, is fluid outlet 171 fixed to the fluid passageway and associated with downhole tool body 162.

When boring in sandy situations, it is preferred to place the nozzle rearward of the tool body and install it in saver sub 232 or adapter 230. As can be appreciated from FIG. 9, disposed adjacent drive spindle 40 and the back end of drill string 44 is saver sub assembly 232. As shown in FIG. 16, within saver sub assembly 232 is filter seating plug 245 which is internally threaded to hold nozzle 76. If inserted in saver sub 232, inner nozzle 76 meters the amount of and controls the rate of fluid that the surface fluid pump discharges into borehole 16. Once ejected from that inner nozzle, the fluid fills drill string 44 and exits out through outlet or building 171 in tool body 62, 162 or 362. The hole in outlet or bushing 171 is large enough so that the downhole debris entering drill string 44 when the flow stops will likely be flushed back out when the flow resumes. In the preferred embodiments, outlet 171 has a diameter approximately the same as the diameter of the fluid passageway. This arrangement is particularly beneficial when drilling in sand or sandy soils where sand particles flowing back into a small orifice nozzle located at end 166 of body 162, could at least partially plug the opening when pressurized flow is resumed.

When installing the nozzle in saver sub 232, the operator must be careful. When the fluid pump is turned on, the pressure gauge will begin to show pressure before fluid ever reaches the tool body. Even though the gauge shows pressure, the operator must wait until the fluid has reached the tool body. This waiting time varies depending upon whether there are just a few feet or a few hundred feet of drill pipe in the ground. If the operator happens to thrust the tool body forward before fluid reaches it, there is the possibility of plugging the tool body. If drilling is continued while the tool body is plugged, damage to the transmitter can occur.

To reduce the operator involvement in this process, one can alternatively install nozzle 76 in adaptor 230. By installing nozzle 76 in adapter 230, the operator knows that when the gauge pressures up, the fluid is at the tool body. This is true whether there are thirty feet or three hundred feet of pipe in the ground.

Saver sub 232 and adapter 230 both include filter and gasket combinations 240 and 242 as seen in FIG. 16. Filter and gasket combination 240 includes 30 mesh coarse screen filter for use with drilling fluids (bentonite, polymers, etc.). Fluid filter and gasket combination 242 includes 100 mesh fine screen for use with water or a water and antifreeze combination. If one uses 100 mesh filter with drilling fluid, the filter may collapse and stop the flow of fluid. The purpose of the filters is to remove any particles from the fluid flow which could obstruct nozzle 76.

FIGS. 23–27A illustrate an alternative tool body embodiment 362. As shown in FIGS. 23–26, some embodiments function to deflect fluid from nozzle 76 to an acute angle relative to the longitudinal axis X—X of the drill pipe. In particular, by having spray from nozzle 76 impinge upon removable cutting blade 372, the deflected jet stream should more easily allow redirecting of the body out of an existing borehole. This becomes important if an obstruction is encountered.

Figure 24:
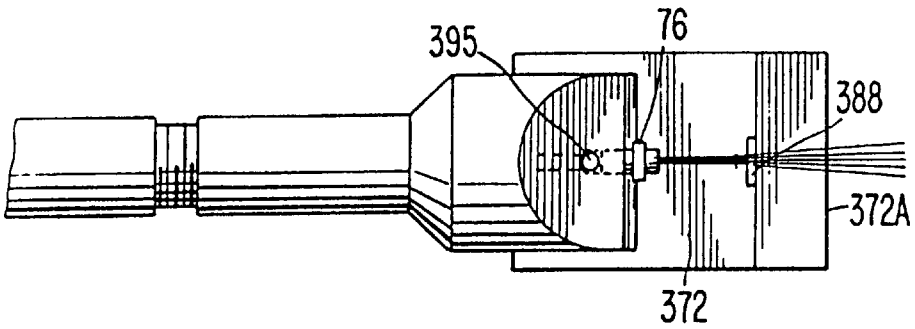
FIG. 24 is a top view of the downhole tool of FIG. 23.
Figure 26:
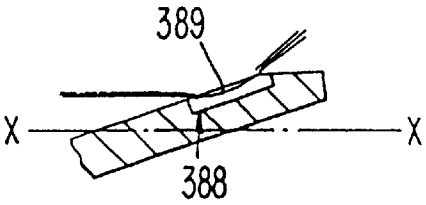
FIG. 26 is an exploded view of the blade of the downhole tool of FIG. 23 illustrating the wear resistant material on the blade.

The deflecting portion of blade assembly 372 comprises wear-resistant material 388 disposed in the blade as seen in FIGS. 24 and 26. Furthermore, the deflecting material 388 includes concave portion 389 for controlling the fluid spray pattern.

Figure 28:
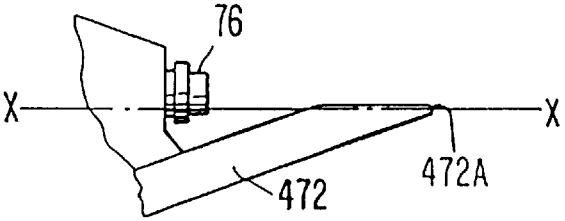
FIG. 28 is a partial view of the downhole tool body of FIG. 23 including an alternative embodiment of a blade.

As soils become more difficult to drill, it is preferred to have the forward end of the blade assembly adjacent the longitudinal axis X—X of the drill pipe as in FIG. 28. This relationship of the blade assembly forward end to axis X—X is preferred, because if one happens to drill into a hard soil or soft rock, the downhole tool and its drill sting will start rotating around the tip of the tool. If the blade assembly tip is not on or adjacent the centerline of the bore, this may cause the rear portion to wobble and rub against walls of the diameter of borehole 14 which are behind the bit. Thus, in these situations blade assembly 472 of FIG. 28 may be more advantageous. Therefore, in the embodiment of FIG. 28, a forward end 472A of blade assembly 472 is adjacent and in fact on the longitudinal axis X—X of the drill pipe. For example, when harder soils or soft rock formations are anticipated, a tapered (pointed) rather than straight leading edge on the blade assembly (as in the spade-like blade assembly of FIGS. 32 and 33 or the stepped-taper blade assembly of FIGS. 29–31) can further aid in causing the blade assembly to "pilot" into the end of the borehole and will also rotate more smoothly than a straight-edged bit in such hard conditions.

In soft soils, however, it is preferred to have the forward end of the blade assembly extend beyond the longitudinal aids X—X of the drill pip as in FIGS. 23–26. In soft soils, the tool will not tend to pilot on the face of the bore but instead will slip across it. In fact, for such soils it is advantageous for the blade assembly to be above (i.e., beyond) the centerline of the borehole in order to provide more steering force. It should be recognized that the above principle would apply whether or not deflecting of the spray is employed. By varying the lateral displacement of the jet relative to the X—X axis, a deflecting of the spray can be accomplished for the various types of blades discussed herein.

Figure 27A:
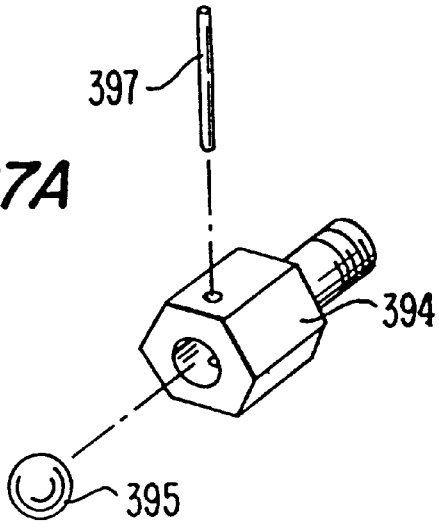
FIG. 27A is a perspective view of the check valve assembly of FIGS. 24 and 27.
Figure 27:
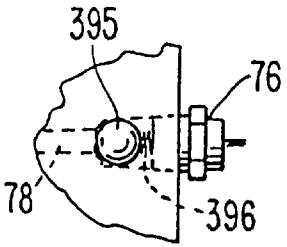
FIG. 27 is an exploded view of FIG. 24 showing a ball in a check valve assembly which is disposed inside the fluid passageway and adjacent the nozzle.

Shown in FIGS. 24, 27 and 27A is ball check valve 394 to prevent sand or the like from plugging the nozzle opening. When boring a hole in a tight formation, there tends to be a head pressure in borehole 16 at front portion 166 or 366 of downhole tool 162 or 362. Therefore, when one shuts off fluid flow to drill string 44 in order to, for example, add another piece of drill pipe, external debris-laden fluid in the borehole can actually flow upstream and into the drill pipe. Cuttings such as grains of sand and the like which enter nozzle 76 may plug the relatively small nozzle orifice 77 and, after adding a new piece of drill pipe and beginning fluid pressure through the fluid passageway, restrict or prevent the start of flow again.

It is preferred, therefore, to have check valve 394, disposed in the passageway, for opening the passageway when fluid pressure in the passageway towards nozzle 76 and on valve 394 is greater than pressure from borehole 16 on valve 384, and for closing the passageway when pressure from borehole 16 on valve 394 is greater than fluid pressure in the passageway towards nozzle 76 and on valve 394. The preferred valve includes ball 395 for preventing external downhole particles from entering a portion of the fluid passageway which is upstream of the ball. Also, included in valve 394 is roll pin 397.

Even with an essentially horizontal drill string, there is a tendency for fluid to flow out of nozzle 76 during the addition to the drill string or other work stoppages. This tends to be wasteful of drilling fluid and also causes delays in re-initiating the drilling operation, because of the time required to refill the drill string and reach operating pressure. This factor can become significant when drilling longer boreholes. Thus, the check valve means also preferably includes spring 396 disposed in the passageway and on a front side of the ball. The spring provides little pressure. In fact, the spring only biases the check valve closed with sufficient force to hold fluid in the drill string when pump flow is stopped and another joint of pipe is added to the drill string. In particular, the light spring force only causes the ball to close the passageway when the pressure of fluid in the passageway towards nozzle 76 and on ball 395 is less than 10–20 PSI.

As discussed herein, as an alternative to using ball check valve 394 one can use nozzle 76 in saver sub assembly 232 in combination with outlet 171. If the nozzle 76 is moved to adapter 230 instead of saver sub 232 for operation in sand, however, the ball check valve may preferably be used in combination with the nozzle to prevent plugging since nozzle 76 is only about a foot behind forward portion 166 (containing bushing/outlet 171) of body 162. In fact, a further reason for having the nozzle in adapter 230 at the downhole end of the drill string is to make use of the spring-biased check valve method of keeping the drill string full.

When drilling with nozzle 76 in saver sub 232 or adapter 230 and with check valve 394 installed in place of the nozzle on the tool body, one will reduce the change of mud and fluid being sucked back into the housing while breaking loose drill pipe to add another joint. This should also reduce the chance of plugging the tool body. In addition, it should reduce the possibilities of damaging the transmitter 220. Note, however, it is strongly suggested that one should not run nozzles in both the tool body and adapter 230 at the same time.

Also, one can also utilize two or more jets instead of one. It is preferred that these jets also be displaced vertically from the centerline of the housing as in FIGS. 13 and 23 and side by side. In other words, the front of body 362 of FIG. 25 can be modified to include one or more nozzles 76 laterally displaced from longitudinal axis X—X of drill pipe 42.

Figure 29:
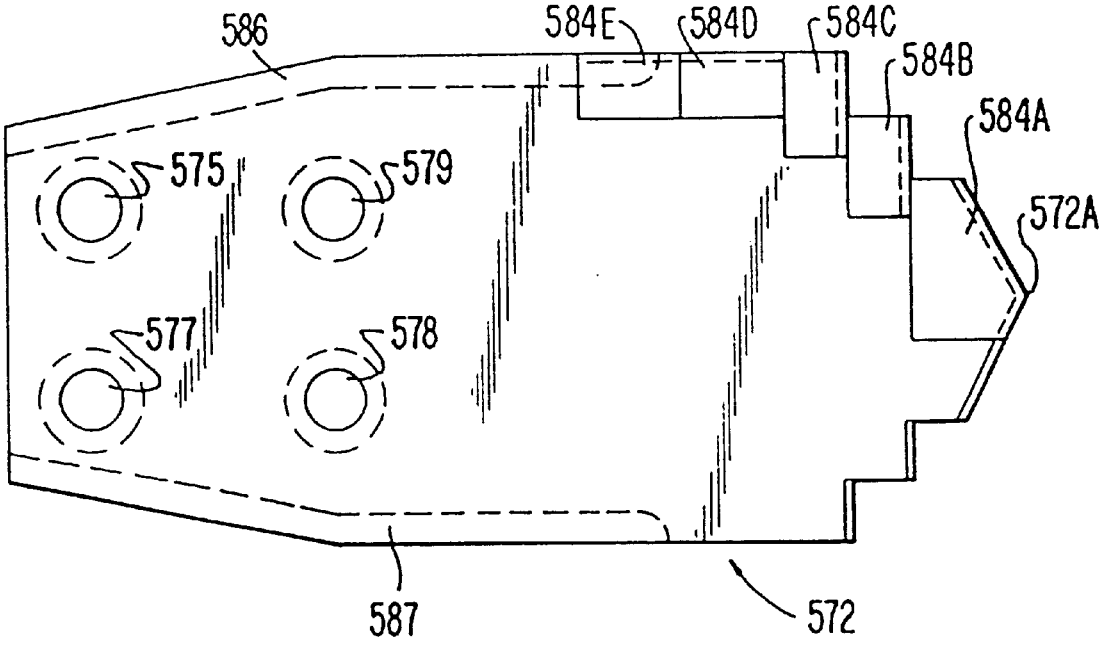
FIG. 29 is a top view of a hard soil/soft rock tapered blade assembly.
Figure 30:
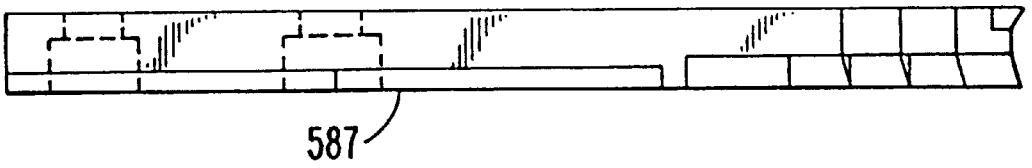
FIG. 30 is a side view of the hard soil/soft rock tapered blade assembly of FIG. 29.
Figure 31:
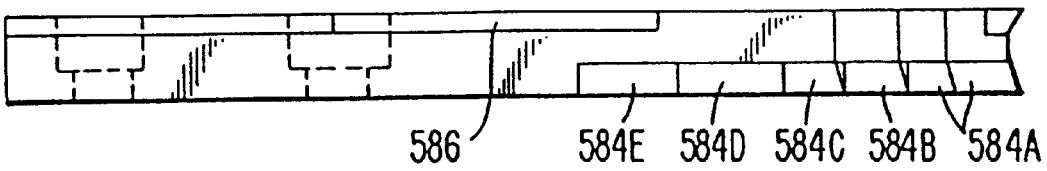
FIG. 31 is an opposite side view of the hard soil/soft rock tapered blade assembly of FIG. 29.

Shown in FIGS. 29–31 is removable blade assembly 572 for hard soil or soft rock cutting. In particular, blade assembly 572 is for drilling harder formations such as soft sedimentary rocks (i.e., sandstone or even soft limestone). Stepped-taper blade assembly 572 is advantageous because it has improved steering control. Blade assembly 572 includes a forward portion including end 572A, which when mounted on the tool body, projects beyond a forward end of the drill body. The forward portion of blade assembly 572 preferably, when viewed from its top as in FIG. 29, has a staggered profile which steps rearwardly from a forward-most point 572A at a center of the blade to an outside of the forward portion of the blade.

As discussed with respect to blade assembly 272 of FIGS. 21 and 22 and blade assembly 672 of FIGS. 32 and 33, blade 572 also preferably includes a plurality of strips 584A–E which are disposed on recessed portions of the top and bottom surfaces of the substantially flat blade assembly. These strips have the primary contact with the earth when the blade assembly is simultaneously rotated and axially advanced.

The forward portion of a top of blade assembly 572 is a mirror image of a forward position of a bottom of blade assembly 572. Furthermore, as discussed it is preferred to have strips 584A on the top and bottom surfaces extend across the centerline of blade assembly 572 and to have these same strips extend forward of the forwardmost point of the blade as illustrated in FIGS. 30 and 31.

Forward portion of blade assembly 572 is wider than rear portions of the blade for smoother operation when rotated in hard soil or soft rock formations. Also, bottom edges 586 and 587 include wear resistant material such as carbide. Also, apertures 575 and 577–579 are for mounting the blade assembly on a tool body 162 or 362.

Blade assembly 572 has been shown to penetrate hard formations at a fast drilling rate, as well as enabling some corrective steering action in those formations. In this hard formation application, as was mentioned herein, it is desirable to have the forwardmost point on strip 584A on the longitudinal axis X—X of drill pipe 42 in order to prevent the tool body from being rotated eccentrically around the center of bit rotation. In order to steer in soft rock, it takes an operating technique of intermittent rotating and thrusting. With this technique, directional blade assembly 572 allows a selective chipping away of the face of the borehole in order to begin deviating in the desired direction.

Figure 34:
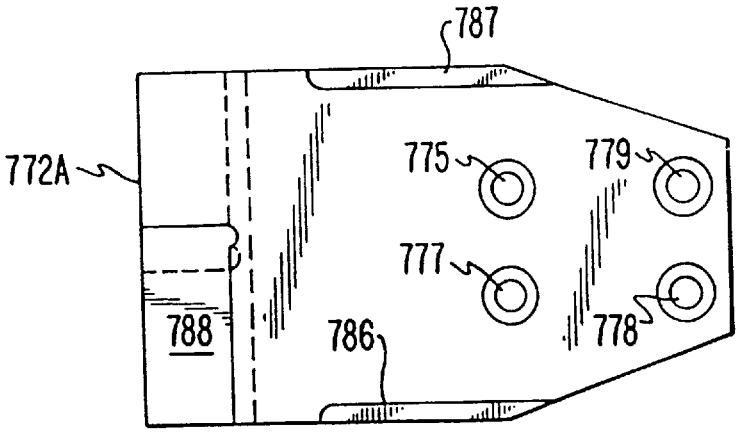
FIG. 34 is a bottom view of a relatively wide blade assembly.
Figure 35:
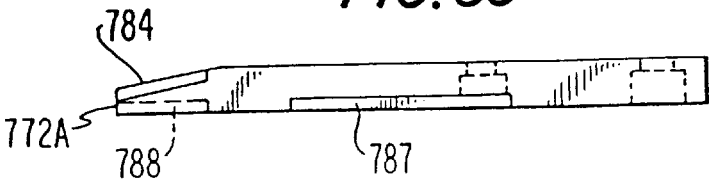
FIG. 35 is a side view of the relatively wide blade assembly of FIG. 34.

Blade assembly 772 of FIGS. 34 and 35 is a 4" wide bit having hard facing carbide strips 784 and 788 at forward point or tip 772A and carbide strips 786 and 787 all functioning and having advantages as discussed herein. The 4" wide blade assembly is preferred for making a larger pilot hole so that backreaming is not necessary for a 3" to 4" conduit installation.

There can also be an assembly associated with the drill frame 18 or 118 of a boring machine for preventing rotation of a drill pipe 42 having wrench receiving slots 43 as shown in FIG. 9. The assembly includes wrench 238A of FIG. 15A having an open end for removably engaging wrench receiving slots 43 of a rearward portion of a lower or first drill pipe. Also, included is pin 237 received in apertures of both the wrench and the frame and disposed adjacent forward end 118A of the frame for attaching wrench 238 to the frame. When the wrench engages the drill pipe, the lower or first drill pipe is substantially prevented from rotation.

With this preferred structure, a method of breaking a joint between drill pipe 42 and rotary drive 24 with saver sub 232 can include the steps of moving saver sub 232, which is joined to drill pipe 42, to a forward portion in drill frame 18 or 118. This joint breaking method then includes placing lower joint wrench 238, which is attached to the frame and adjacent a forward end 118A of the frame, in wrench receiving slots 43 on drill pipe 42 to substantially prevent rotation of the drill pipe, and using rotary drive 24 to rotate saver sub 232 in a reverse direction to unscrew saver sub 232 from drill pipe 42.

The method of adding a second drill pipe between saver sub 232 and a first drill pipe 42 includes breaking a joint between first drill pipe 42 and saver sub 232 as discussed in the prior paragraph. The method further includes the steps of moving saver sub 232 to a rearward portion in drill frame 18 or 118, placing a second or intermediate drill pipe in the frame between saver sub 232 and the lower or first drill pipe, threading a male end of the second or intermediate drill pipe into the saver sub, aligning a female end of the second drill pipe with a male end of the first drill pipe, moving the second drill pipe forward until a female end of the second drill pipe fits around a male end of the first drill pipe and applying rotational torque to tighten the rotating second drill pipe with the stationary first drill pipe. This method can further include the steps of a slight reversing rotation to relieve pressure on joint wrench 238 and removing the joint wrench from wrench receiving slots 43 of the first drill pipe 42.

Preferably an open end of wrench 238 is at a first end of the wrench and a pin receiving aperture 239 of the wrench is at an opposite second end of the wrench so that the wrench can be rotated into engagement with the wrench receiving slots of the drill pipe. In addition, it is preferable that the wrench can be slid on pin 237 in a direction parallel to a centerline of drill pipe 42 for easy alignment with drill pipe receiving slots 43.

A second wrench 238' is also preferred for removing a second drill pipe from between a first drill pipe and saver sub 232 as would be required when withdrawing the drill string from the borehole. The second wrench 238' also has aperture 239' for receiving pin 237' which attaches the second wrench to frame 18 or 118. The second wrench is closer to rearward end 18B or 118B of the frame than to forward end 18A or 118A of the frame. A preferred method for removing a second drill pipe from between a first drill pipe and saver sub 232 includes the steps of moving rotary drive 24 to a substantially rearward position in drill frame 18 or 118 so that wrench receiving slots on a rearward portion of the first drill pipe are adjacent a forward end of the frame and the second or intermediate drill pipe is disposed on the frame between the saver sub and the first or lower drill pipe. This method then includes placing a first joint wrench 238, which is attached to the frame and adjacent forward end 18A or 118A of the frame, in wrench receiving slots 43 of the first drill pipe to substantially prevent rotation of the first drill pipe. The next preferred step includes securing the second drill pipe to saver sub 232 to ensure that the joint of the second drill pipe to the first drill pipe will loosen before the joint of the second drill pipe to the saver sub when rotational torque is applied to the second drill pipe. It is preferred that a lock be applied between the saver sub and the second drill pipe so that this joint does not break before the joint between the second drill pipe and the lower first drill pipe is broken. One can, however, use additional torque applied by a hand held pipe wrench on the second drill pipe to accomplish this same function, i.e., to insure that the lower joint is broken first.

The method then includes applying a rotational torque to the second drill pipe which is sufficient to loosen the second drill pipe from the first drill pipe. After applying this rotational torque, one can then unsecure the second drill pipe from the saver sub. The method then includes rotating the saver sub and the second drill pipe in a reverse direction to unscrew the second or intermediate drill pipe from the first or lower drill pipe. Further steps include placing second joint wrench 238' which is attached to the frame, in wrench receiving slots on a rearward portion of the second drill pipe to substantially prevent rotation of the second uppermost drill pipe, and rotating the saver sub in a reverse direction to unscrew the saver sub from the second drill pipe.

Additional steps in removing a second drill pipe can include removing second joint wrench 238' from the wrench receiving slots of the second drill pipe and removing the second drill pipe from the frame. Further steps can include moving rotary drive 24 forward in the frame, rotating the saver sub to join it with the first drill pipe and, removing the first joint wrench from the wrench receiving slots of the first drill pipe. To remove additional drill pipes, these above recited steps can be repeated.

Having a joint wrench attached to the frame provides advantages in safety, simplicity and economy. Safety is attained because attaching the wrench to the frame alleviates the prior worry about the wrench being accidentally loosened if, for example, the drill pipe accidentally rotates in an opposite direction than desired. Also, by using this fixed wrench assembly, one eliminates the complex hydraulic systems and the need for another valve section as would be required for a powered break-out wrench.

All patents and applications mentioned in this specification are hereby incorporated by reference in their entireties. In addition, the structures described in this specification and claimed are preferably used with structures disclosed in U.S. patent application Ser. Nos. 07/539,851; 07/539,699; 07/539,551; 07/539,847; 07/539,616; 07/513,186; and 07/513,588 which are also hereby incorporated by reference in their entireties.

Figure 36:
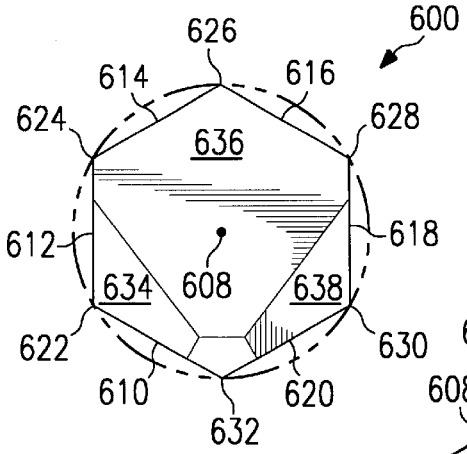
Figure 37:
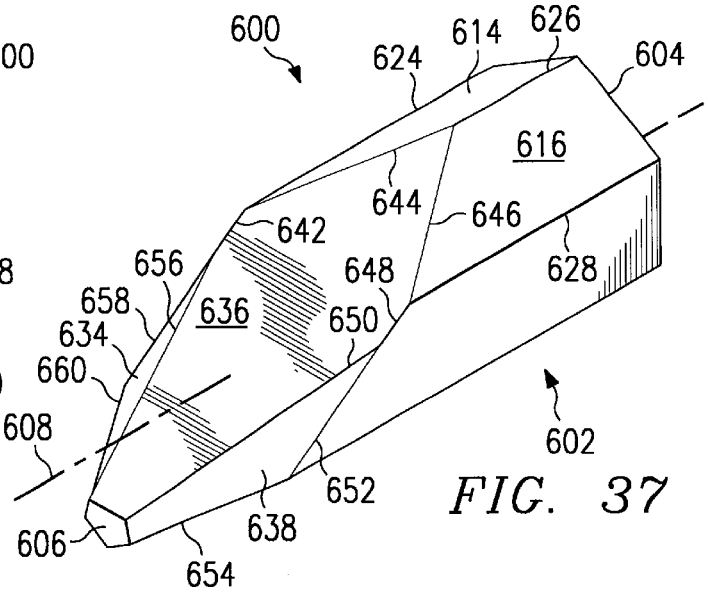

With reference now to FIGS. 36–55, a number of bits suitable for use with the boring machine will be described. These bits will be used for horizontal and near horizontal drilling as well as vertical drilling. FIGS. 36 and 37 illustrate a bit 600. The bit has a body 602 which defines a rearward end 604 for attachment to the drill string and a forward end 606 facing the ground to be bored.

The portion of the body adjacent the rearward end 604 can be seen to have a hexagonal cross-section perpendicular to the axis of rotation 608 of the bit. The body defines six parallel surfaces 610–620 which each extend parallel the axis 608. Outer edges 622–632 are defined at the intersection of the parallel surfaces as illustrated.

Three angled surfaces 634, 636 and 638 are defined on the body and extend from intermediate the rearward and forward ends to the forward end 606. Each of the surfaces 634, 636 and 638 are at an angle relative to the axis 608. The orientation of the angled surfaces can be defined relative to a hypothetical framework 640 (illustrated in FIG. 39) which is defined as if the parallel surfaces 610–620 of the body extended all the way to the forward end 606. The angled surfaces 634 and 638 can be seen each to intersect two of the hypothetical parallel surfaces, specifically parallel surfaces 610 and 612 in the case of angled surface 634 and parallel surfaces 618 and 620 in the case of angled surface 638. It is also helpful to define a plane of symmetry 601 (not shown) which contains axis 608 and divides the drill bit 600 into two mirror image halves. Each angled surface 634 and 638 is a mirror image of the other relative the plane of symmetry 601. Angled surface 636, in turn, will intersect a total of four parallel surfaces, specifically surfaces 612–618. Angled surface 636 also is bisected by the plane of symmetry 601. The intersection of the angled surfaces and the actual parallel surfaces will define a series of edges 642–660 between the various intersecting surfaces, each one of those edges being at an angle relative to the axis 608.

The bit 600 has numerous advantages in the drilling operation. Each of the edges 622–632 and 642–660 are potential cutting surfaces to cut the ground. The angled surfaces 634, 636 and 638 define an area as the drill bit is thrust forward which causes the drill bit to be deflected in a new direction. The area is a compaction area during thrust and simultaneous rotation. Further, the inclined surfaces 634–638 define incline planes that, as the bit is rotated and thrust forward simultaneously, permit the surfaces 634–638 to work in conjunction with cutting edges 642–660 to cut the periphery of the borehole and simultaneously compact the material into the bore wall or pass the cuttings through the relief areas defined by the borehole and surfaces 610–620. Further, the use of a hexagonal cross-section defined by the surfaces 610 through 620 will further define an additional relief area as the drill bit is rotated bounded by the surfaces and the cylindrical bore cut through the ground. This additional relief area will also assist steering of the bit. As the drill bit is rotated to form a borehole, the bit will define a cylindrical borehole of diameter determined by the radial dimension between the axis of rotation 608 and the edges 622–632. When the bit rotation is halted to steer the bit into a new direction, voids exist between the inner surface of the borehole and the surfaces 610–620, providing this additional area to more easily deflect the bit into the new direction of drilling. It also has a stabilizing effect to maintain a truer line (course) while making corrections to a new base path.

Figure 38:
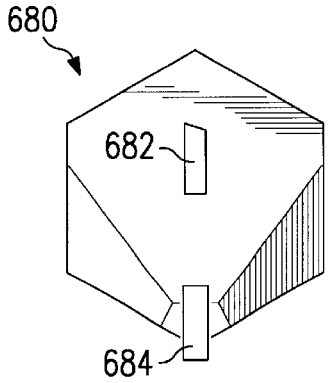
Figure 39:
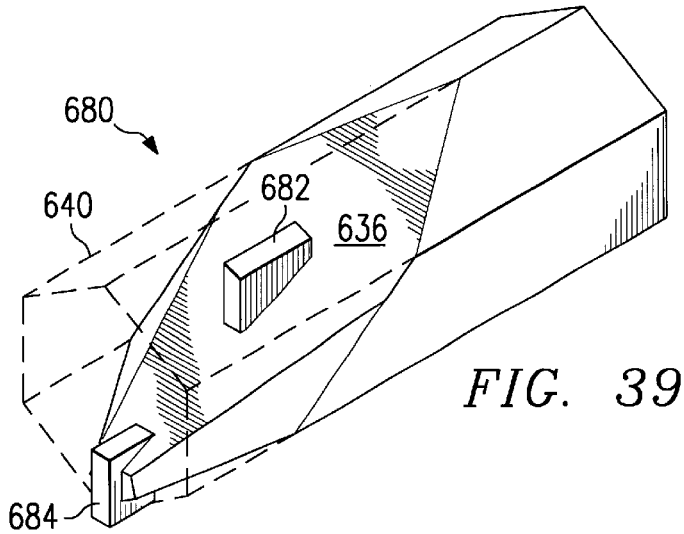

With reference now to FIGS. 38 and 39, a bit 680 is illustrated which is in all respects identical to bit 600 with the exception of the addition of two carbide cutting tips 682 and 684. The carbide tip 682 is positioned to extend outwardly from about the center of surface 636 and near axis 608. The carbide tip 684 is at the forward end 606. As the bit 680 rotates, the carbide tips will define cutting circles established by radial distance between the rotational axis 608 and the individual tip. Tip 682, being closer to axis 608, defines the inner cutting circle. Tip 684, at the outer portion of the bit, defines the outer cutting circle. The tips 682 and 684 assist in boring, particularly in cutting through hard soil conditions.

Figure 40:
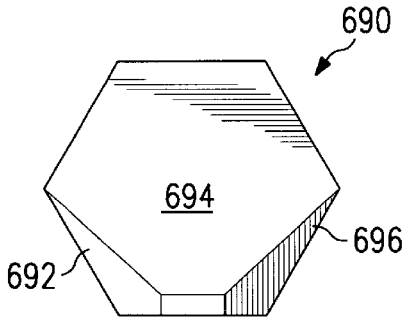
Figure 41:
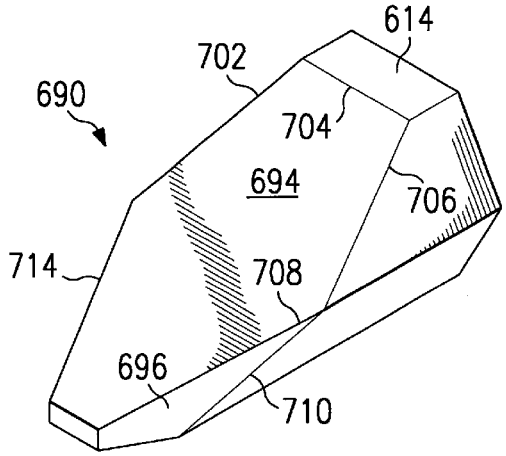

FIGS. 40 and 41 illustrate a bit 690 which is a modification of bit 600. In bit 690, angled surfaces 692, 694 and 696 are positioned on the bit with the surface 694 intersecting five of the six parallel surfaces. The plane of symmetry 698 bisects parallel surface 614 and the angled surface 694. The surfaces define angled outer edges 702–714. The distance between edges 702 and 714 and the edges 706 and 708 are greater in bit 690 than the corresponding distance in bit 600, which makes the surface 694 wider and the bit more appropriate for boring in softer soils. It is expected that bit 690 will be easier to direct in soft soils because of the width of the surface 694 and the greater surface area of the angled surface 694.

Figure 42:
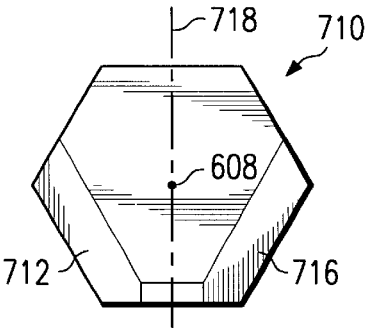
Figure 43:
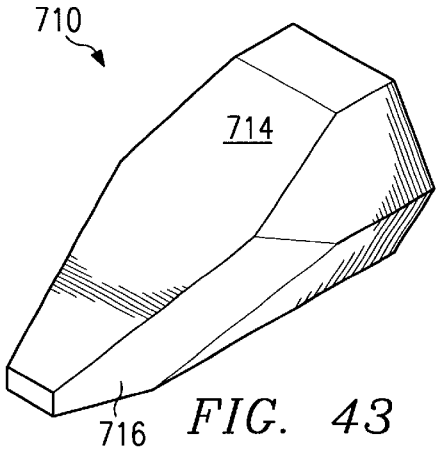

With reference to FIGS. 42 and 43, a bit 710 is illustrated which is a slight modification of bit 690. In bit 710, the angled surfaces 712 and 716 are at a slighter greater angle relative to the plane of symmetry 718 than those of bit 690. It would be expected that bit 710 would be more effective in medium soils than bit 690.

Figure 44:
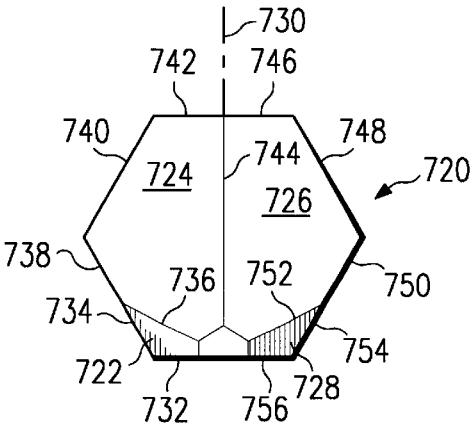
Figure 45:
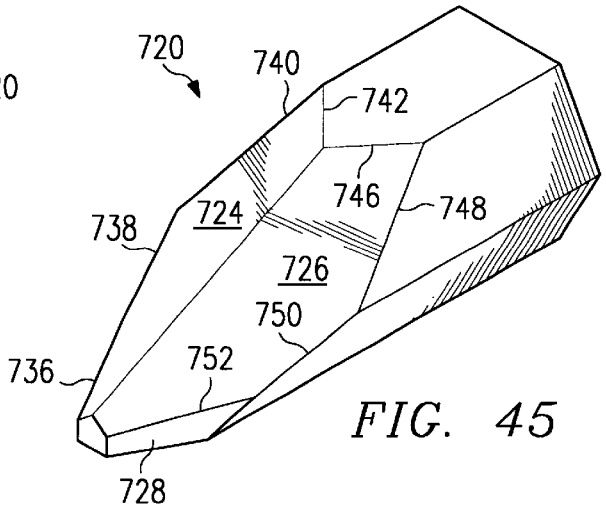

With reference now to FIGS. 44 and 45, a bit 720 is illustrated which is formed with angled surfaces 722–728. Angled surfaces 722 and 724 are on a first side of the plane of symmetry 730. Each of the surfaces 724 and 726 intersect three of the parallel surfaces, while angled surfaces 722 and 728 each intersect two of the parallel surfaces. The surfaces define angled outer edges 732–756. Bit 720 would be intended primarily for clay and harder soils.

Figure 46:
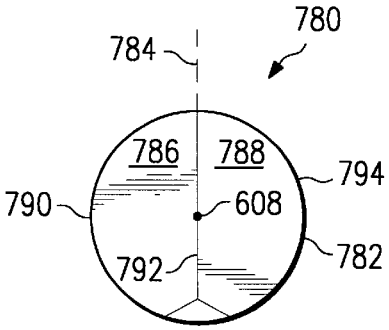
Figure 47:
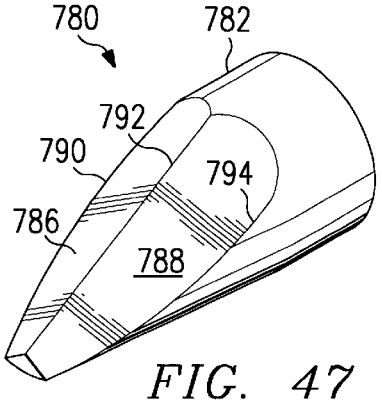

FIGS. 46 and 47 illustrate a bit 780. Bit 780 has a body 782 with a circular cross-section perpendicular the axis 608. A plane of symmetry 784 passes through the bit, intersecting axis 608, to divide the bit into two equal mirror halves. Angled surfaces 786 and 788 are formed on the bit 780 on either side of the plane of symmetry. Because of the circular cross-section of the bit, the surfaces 786 and 788 will define curved edges 790 and 794, and linear edge 792. Bit 780 would also be intended primarily for clay and harder soils.

Figure 48:
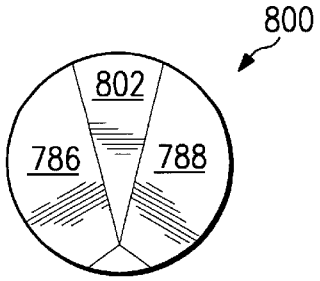
Figure 49:
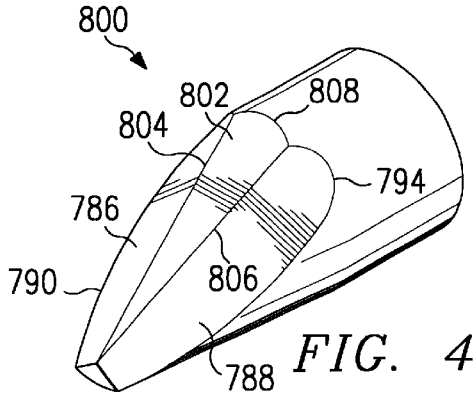

FIGS. 48 and 49 illustrate a bit 800 which is a modification of bit 780. Bit 800 includes a third angled surface 802 which bisects the plane of symmetry to form linear edges 804 and 806 and a curved edge 808.

Figure 50:
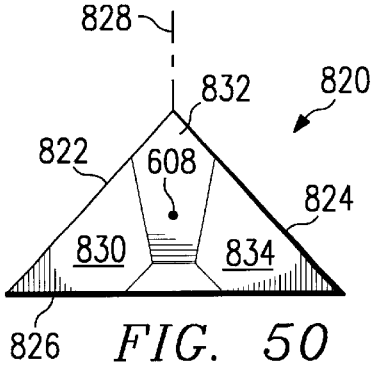
Figure 51:
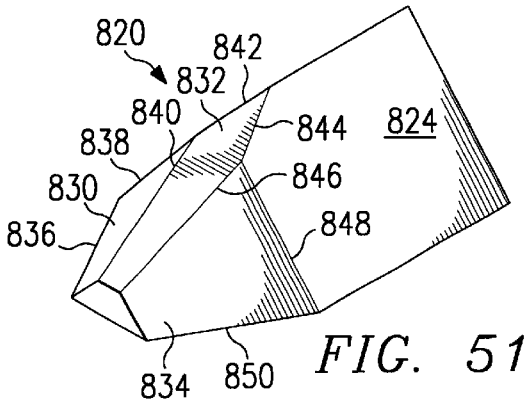

FIGS. 50 and 51 illustrate a bit 820 which has a triangular cross-section perpendicular the axis of rotation 608. The bit defines parallel surfaces 822, 824 and 826. A plane of symmetry 828 is defined through the bit 820 which divides the bit into mirror image halves. Angled surface 830 is formed on one side of the plane while an angled surface 834 is formed on the other side of the plane. An angled surface 832 bisects the plane of symmetry between the surfaces 830 and 834. The surfaces define slanted outer edges 836–850.

Figure 52:
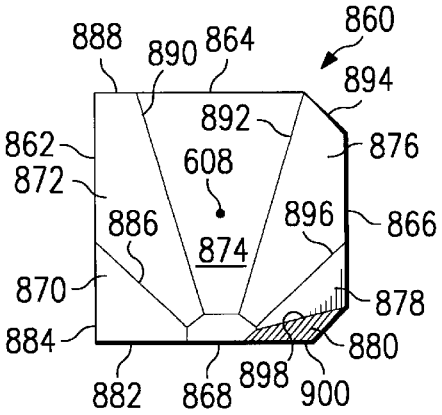
Figure 53:
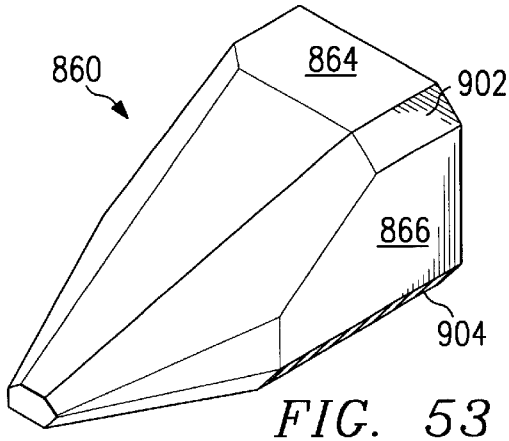

FIGS. 52 and 53 illustrate a bit 860 which has a generally square cross-section perpendicular the axis 608 defining parallel surfaces 862–868. Angled surfaces 870–880 are formed to define angled edges 882–900. It should be noted that bit 860 does not have a plane of symmetry, defining two parallel surfaces 902 and 904 on one side of the bit.

With reference to FIGS. 54 and 55, a bit 920 is illustrated which has a tapered wedged shape. The bit includes parallel surfaces 922, 924 and 926 and angled surface 928.

With reference to FIG. 59, a bit 980 is illustrated which has parallel surfaces 982, 984, 986 and 988 and an angled surface 990. The front end of the bit 992 is perpendicular parallel surfaces 982–988 and is formed at the intersection of parallel surfaces 982 and 988 and angled surface 990. The angled surface 990 preferably extends at an angle of about 20° from the rotational axis of the bit.

With reference now to FIG. 56, a drill bit 950 is illustrated which has a body 952 with a circular cross-section perpendicular the axis 608. A curved surface 954 is formed on the drill bit which extends from near the rear end 604 to the forward end 606. Carbide cutting tips 956 and 958 are mounted along the drill bit to aid in cutting with the same cutting action as described in bit 680.

With reference to FIG. 57, a drill bit 960 is illustrated which has a prong 962 which extends outward from the curved surface 964. A carbide cutting tip 966 is mounted at the end of the prong 962 and a carbide cutting tip 968 is mounted at the end 606 of the drill bit to provide the same cutting action as described in bit 680.

With reference to FIG. 58, a drill bit 970 is disclosed which has a prong 972 extending from surface 974. A carbide cutting tip 976 is mounted at the end of prong 972, a carbide cutting tip 978 is mounted at the end 606 of the drill bit to provide the same cutting action as described in bit 680.

Figure 61:
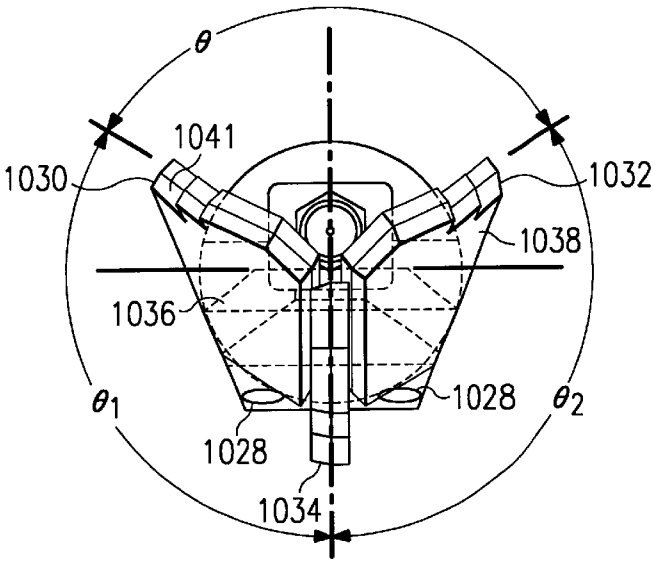
FIG. 61 is a front view of the boring head.
Figure 60:
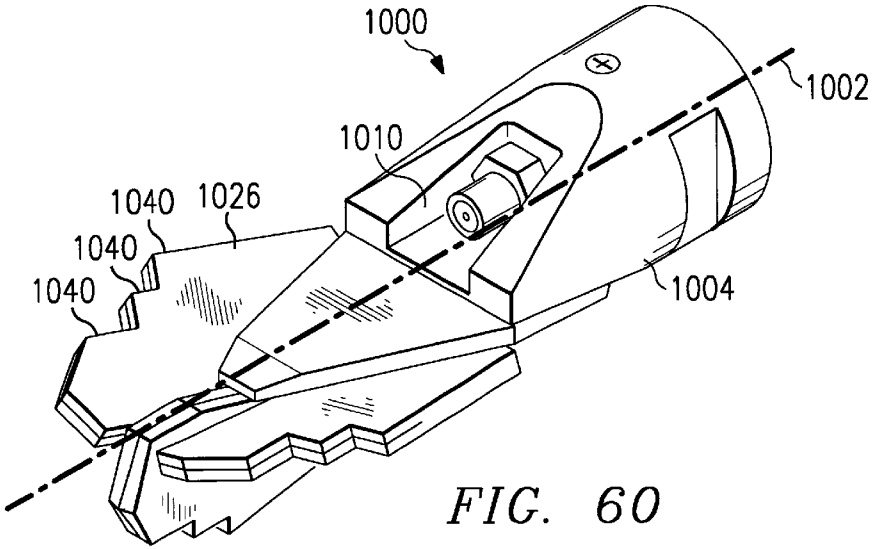
FIG. 60 is a perspective view of a directional multi-blade boring head.
Figure 62:
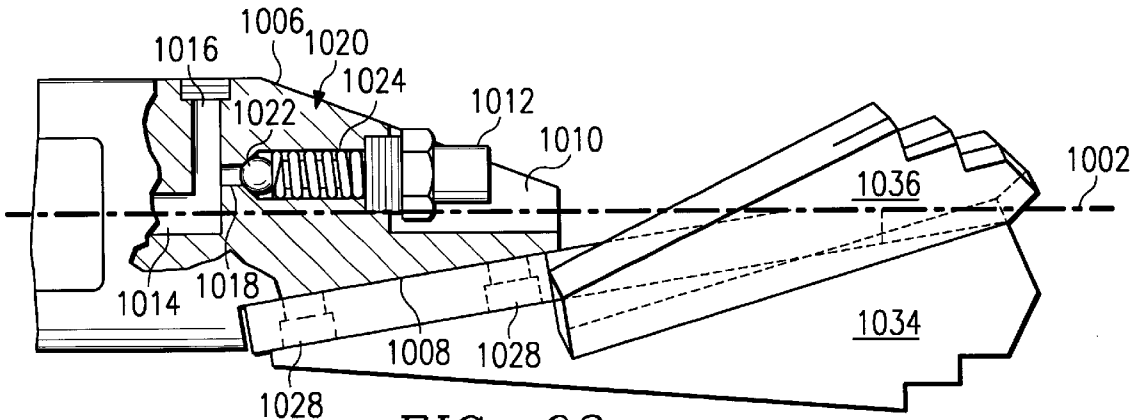
FIG. 62 is a side view of the boring head.

With reference now to FIGS. 60–62, a directional multi-blade boring head 1000 will be described. The head 1000 is mounted at the end of a drill string which is capable of selectively rotating the head about its central axis of rotation 1002 and advancing the head along the axis 1002. The head includes a body 1004 which is attached to the end of the drill string in a conventional manner. The body defines a first planar surface 1006 on a first side of the body and a second planar surface 1008 on the other side of the body. The planar surfaces are both angled in an oblique angle, preferably 13°, relative to the axis 1002. A jet recess 1010 is cut from the first planar surface 1006 and mounts a jet 1012 to discharge a fluid to assist in the boring action.

As can best be seen in FIG. 62, the body has internal passages 1014, 1016 and 1018 which direct the fluid from the drill string to the jet 1012. The fluid can be air, water, gas or any suitable drilling fluid. As can be seen, a check valve 1020 is provided within the passages which includes a check ball 1022 and a spring 1024 to urge the check ball into a closed position unless the fluid pressure in passage 1018 acting on the ball is sufficient to overcome the force of the spring 1024.

A blade assembly 1026 is mounted to the body at the second planar surface 1008. Preferably, the blade assembly 1026 is bolted to the body by bolts 1028 to permit the body assembly to be removed for repair or replaced by a new blade assembly when necessary.

The blade assembly 1026 is formed of at least three blades, including a first blade 1030, a second blade 1032 and at least one intermediate blade 1034.

The first blade 1030 defines a deflecting surface 1036 and the second blade defines a similar deflecting surface 1038. The deflecting surfaces extend at an oblique angle relative to the axis 1002, preferably 13°. These deflecting surfaces act to deflect the head when the drill string to which the head is attached is thrust forward without rotation. Thus, the head 1000 acts as a directional boring head in the manner of the bits and heads described previously.

The first and second blades 1030 and 1032 also define staggered cutting teeth 1040 to assist the boring action. The included angle θ between the first and second blades is preferably about 120°. The intermediate blade 1034 extends between the deflecting surfaces 1036 and 1038 at an angle $\theta_1$ from the first blade and at an angle $\theta_2$ from the second blade. With the single intermediate blade 1034, the angles $\theta_1$ and $\theta_2$ are preferably each 120°.

Each of the teeth 1040 are staggered in the direction of rotation of the head for more effective cutting. Also, carbide cutting elements 1041 form the part of the teeth exposed to the greatest wear to lengthen the service life of the blade assembly 1026.

Figure 64:
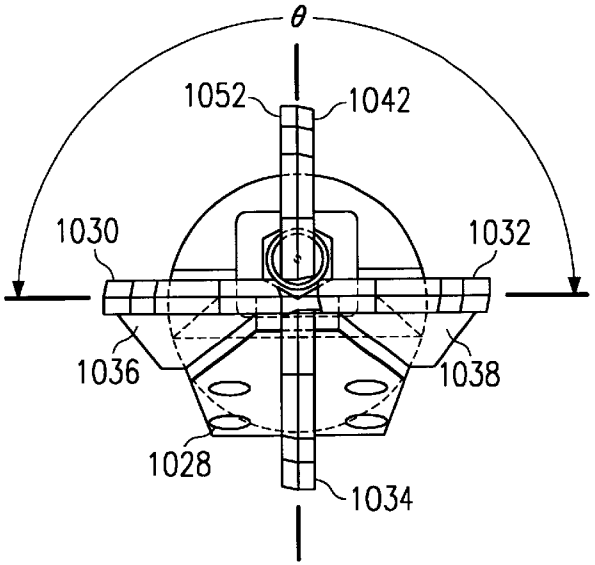
FIG. 64 is a front view of the boring head.
Figure 63:
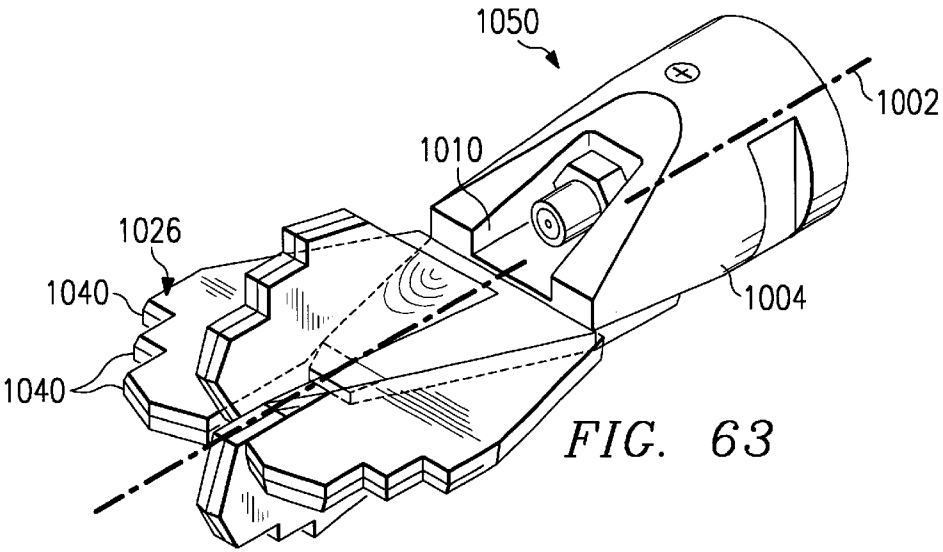
FIG. 63 is a perspective view of a modified directional multi-blade boring head.
Figure 65:
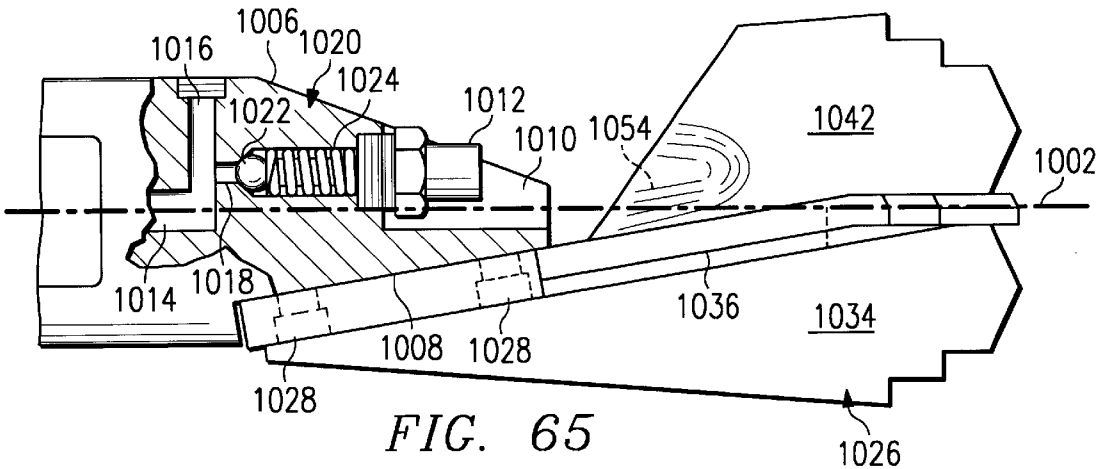
FIG. 65 is a side view of the boring head.

With reference now to FIGS. 63–65, a directional multi-blade boring head 1050, forming a modification of the invention, is illustrated. A number of the elements of boring head 1050 are identical to those of multi-blade boring head 1000. These elements have been identified by the same reference numerals and have similar functions to those described with reference to head 1000.

However, the included angle θ between the blades 1030 and 1032 is 180°. A second intermediate blade 1042 extends between the blades 1030 and 1032 on the sides of the blades opposite the deflecting surfaces 1036 and 1038. The second intermediate blade 1042 in effect forms a continuation of the intermediate blade 1034 and is also provided with serrated teeth 1040 and carbide cutting elements 1041. It will be noted that the discharge of nozzle 1012 will strike a portion of the second intermediate blade 1042 and a recess 1054 has been formed in the blade 1042 to redirect the stream to assist in the cutting action. The four bladed bit 1050 will permit smoother, straighter bores in harder soil conditions while the inclined planes 1036 and 1038 provide the bit with directional capabilities.

Figure 67:
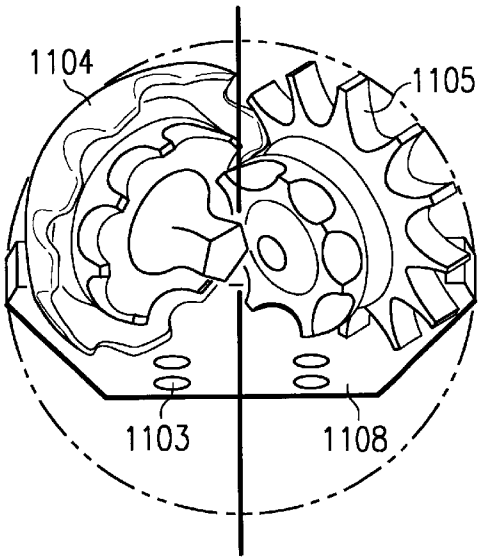
FIG. 67 is an end view of the boring head of FIG. 66.
Figure 66:
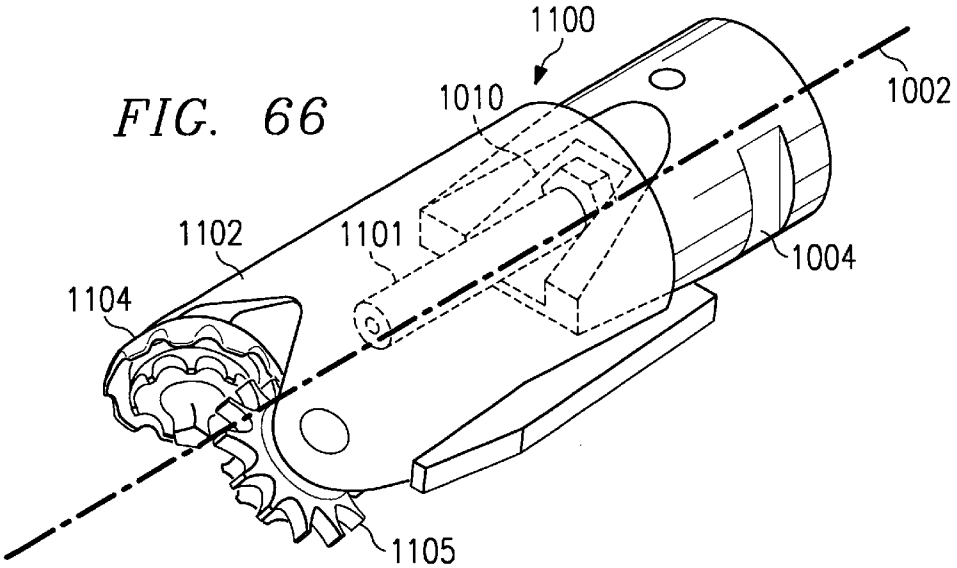
FIG. 66 is a perspective view of a directional boring head.
Figure 68:
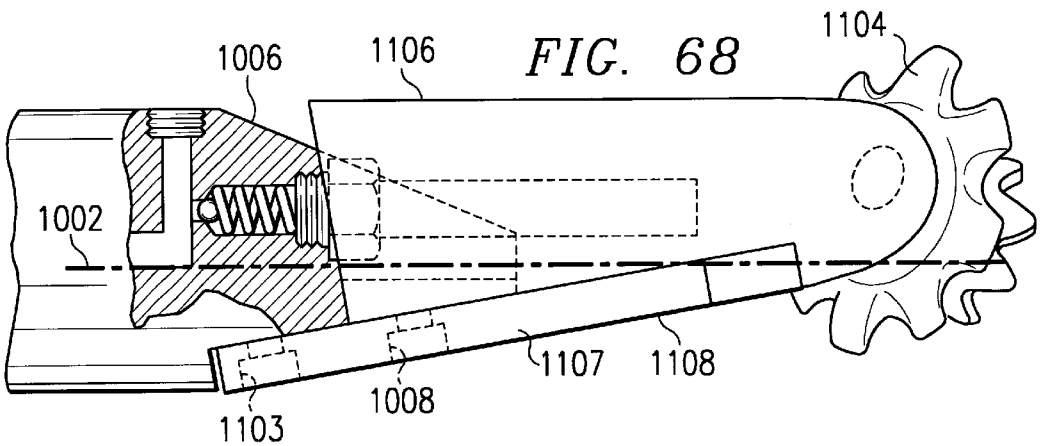
FIG. 68 is a side view of the boring head of FIG. 66.

Now with reference to FIGS. 66–68, a directional dual-cone boring bit 1100 is illustrated. The dual cone boring bit has rotary cutters or cones 1104 and 1105 similar to those used on prior art Tri-cone drilling bits used in the oil field. The boring bit 1100 is used to directionally drill in hard or semi-hard materials. The head 1100 is mounted at the end of a drill string which is capable of selectively rotating the head about its central axis of rotation 1002 and advancing the head along the axis 1002. The head includes a body 1004 which is attached to the end of the drill string in a conventional manner. The body defines a first planar surface 1006 on the first side of the body and a second planar surface 1008 on the other side of the body. The planar surfaces are both angled in an oblique angle, preferably 13 degrees, relative to the axis 1002. A jet recess 1010 is cut from the first planar surface 1006 and mounts a jet 1101 to discharge a fluid such as a liquid or a gas to assist in the boring. The jet 1101 is extended in length as compared to jet 1012 of the previous multi-blade bits to ensure fluid is directed at the dual cones to provide lubrication, cooling and assist in boring. All other aspects of the fluid delivery system are the same as boring heads 1000 and 1050.

The bit assembly 1102 is mounted to the body at the second planar surface 1008. Preferably, the bit assembly 1102 is bolted to the body by bolts 1103 to permit the body assembly to be removed for repair or install a new bit assembly when necessary.

The bit is formed of two roller cones and attachment body consisting of the center cut cone 1104 and adjacent cone 1105 from a standard tri-cone oil field bit. The rotational axis of each of the cones preferably intersects the axis 1002. The cones and bodies are welded to components 1106 and 1107 to form bit assembly 1102. A part of the bit assembly defines a deflecting surface 1108 extending at an oblique angle similar to and causing the bit to act as a directional boring head in the manner of the bits and heads described previously.

Figure 69:
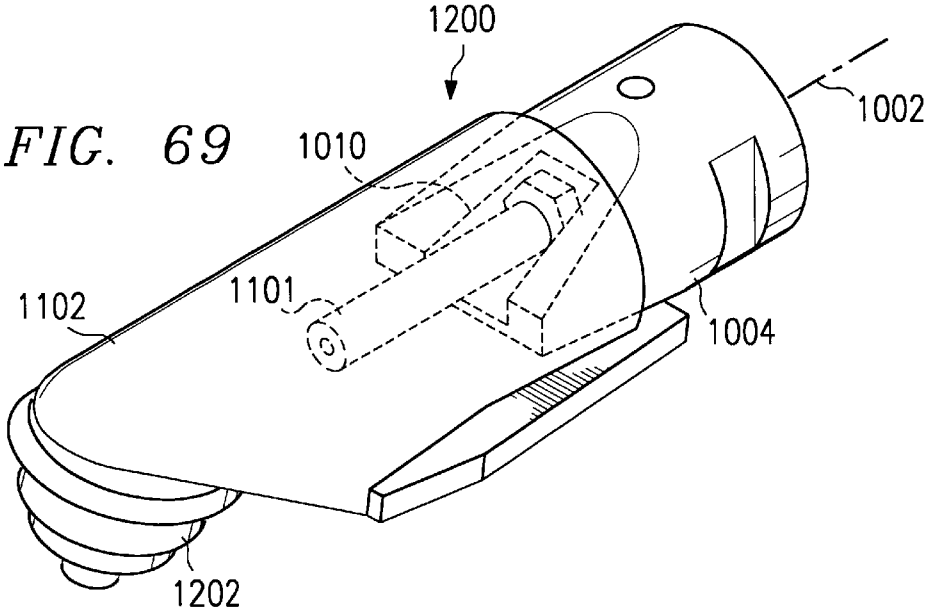
FIG. 69 is a perspective view of a directional boring head forming a second embodiment of the present invention.
Figure 70:
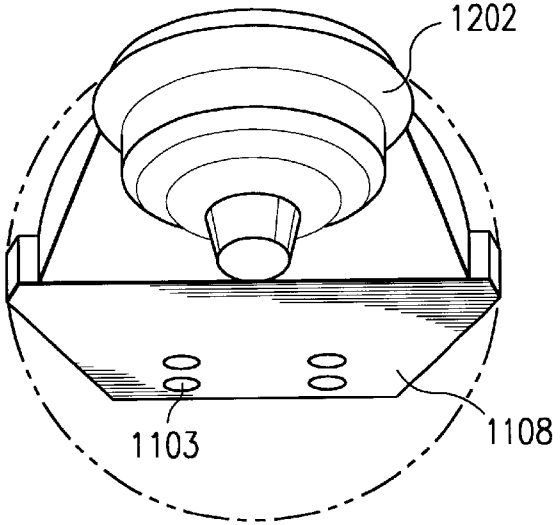
FIG. 70 is an end view of the boring head of FIG. 69.
Figure 71:
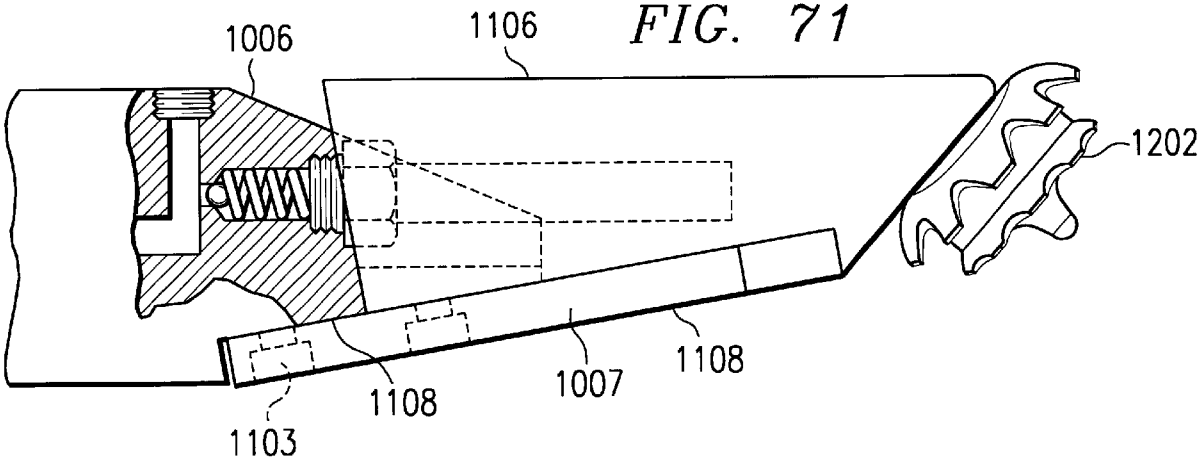
FIG. 71 is a side view of the boring head of FIG. 69.

With reference now to FIGS. 69–[72]*71*, a directional single cone boring bit 1200 is illustrated. The single cone boring bit has a single rotary cutter or cone 1202 similar to those used on prior art tri-cone drilling bits used in the oil field. The jet 1101 discharges against the side of the cutter 1202 to clean debris therefrom. In other aspects, the boring bit 1200 is identical to boring bit 1100 discussed previously and identical elements on the figures are identified by the same reference numerals.

The roller cones described in this invention provide the same cutting action as in the oil field application of the tri-cone bits previously described. These tri-cone bits have one center cut cone and two adjacent cones. However, the addition of the deflecting surface and the removal of one of the adjacent roller cones permits the bit 1100 when thrust forward without rotation to be deflected from the axis of the bore thus permitting the direction of the bore to be altered. The addition of the deflecting surface and the removal of two of the adjacent roller cones permits the bit 1200 when thrust forward without rotation to be deflected from the axis of the bore thus permitting the direction of the bore to be altered. The continuous rotation of the drill bit and application of thrust permits the bore to be in a straight line relative to the drill string axis 1002. The hardness of the material being cut will dictate the amount of steering capable of being accomplished. Some semi-hard materials will permit the oscillating of the bit and the drill string about the central axis of rotation 1002 while applying thrust to change the direction of the bore axis.

The heads 1000, 1050, 1100 and 1200 described have a number of significant advantages over previous known boring heads. The heads 1000, 1050, 1100 and 1200 bore a rounder, straighter hole than a one-sided slanted head which tends to drill more of a helical borehole. The heads 1000, 1050, 1100 and 1200 have proven particularly effective in boring productivity and direction accuracy through sand and rock. With previous one-sided slanted heads, the head could impact and catch on a hard object, causing the boring rods in the drill string to wind up in torsion until the head breaks free of the object with a sudden release. The heads 1000, 1050, 1100 and 1200 appear to alleviate this problem.

The additional advantages of heads 1000, 1050, 1100 and 1200 include an improvement in the directional accuracy of the head through rock and other hard boring conditions. The boring head also uses less water to cool the bit which has significant advantages as EPA regulations for disposal of drilling fluids are becoming more difficult to comply with. The presence of the blades also reduces a tendency for the head to roll when pushed forward without rotation to make a directional change. Finally, the head provides an improved ease of surface launch.

While the invention has been described with a certain degree of particularity it is manifest that many changes may be made in the details of construction and arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

We claim:

1. A directional boring head for a boring machine, the boring machine capable of axially advancing and rotating a drill string about an axis of rotation underground, the drill string ending in the directional boring head, said directional boring head comprising:

a body having a central axis of rotation;

a deflection structure mounted on the body defining a deflecting surface at an oblique angle to the central axis of rotation of the body;

[at least one] *a single* roller cone mounted to said body; and the deflecting surface deflecting the boring head as the boring machine advances the drill string without rotation and the directional boring head drilling a relatively straight borehole as the boring machine advances the drill string with rotation.

[2. The direction boring head of claim 1 having two roller cones mounted on the body.]

3. The directional boring head of claim 1 wherein a fluid jet is mounted on the body, the body having a passage for flow of fluid for discharge from the jet to assist in the drilling.

4. The directional boring head of claim 3 wherein the jet is oriented to discharge a fluid at the roller cone.

5. The directional boring head of claim 1 wherein the deflection structure and roller cone are mounted on a bit assembly removably attached to the body.

6. The directional boring head of claim 1 wherein the rotational axis of the roller cone intersects the central axis of rotation of the body.

[7. The directional boring head of claim 1 having one roller cone mounted on the body.]

* * * * *